(12) United States Patent
Saito et al.

(10) Patent No.: US 9,417,825 B2
(45) Date of Patent: Aug. 16, 2016

(54) IMAGE FORMING APPARATUS, IMAGE FORMING METHOD, AND IMAGE FORMING SYSTEM WITH DECOLORABLE PRINTING AND NON-DECOLORABLE PRINTING

(71) Applicants: KABUSHIKI KAISHA TOSHIBA, Tokyo (JP); TOSHIBA TEC KABUSHIKI KAISHA, Tokyo (JP)

(72) Inventors: Koichiro Saito, Kanagawa (JP); Mikio Kakizaki, Tokyo (JP); Atsushi Nakamoto, Shizuoka (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/882,350

(22) Filed: Oct. 13, 2015

(65) Prior Publication Data

US 2016/0154614 A1     Jun. 2, 2016

(30) Foreign Application Priority Data

Oct. 17, 2014    (JP) .................................. 2014-212955

(51) Int. Cl.
*G06F 3/12*   (2006.01)
*H04N 1/60*   (2006.01)
*H04N 1/00*   (2006.01)

(52) U.S. Cl.
CPC ............ *G06F 3/1219* (2013.01); *G06F 3/1252* (2013.01); *H04N 1/00456* (2013.01); *H04N 1/60* (2013.01); *H04N 2201/0082* (2013.01)

(58) Field of Classification Search
CPC ............................. G06F 3/1219; G06D 3/1252
USPC .................................. 399/38, 46, 82, 85, 157
See application file for complete search history.

(56) References Cited

U.S. PATENT DOCUMENTS

| | | | |
|---|---|---|---|
| 2010/0272449 A1* | 10/2010 | Yoshida | H04N 1/32133 399/2 |
| 2012/0170064 A1 | 7/2012 | Hibino et al. | |
| 2016/0033886 A1* | 2/2016 | Aoki | G03G 9/0821 399/321 |

* cited by examiner

*Primary Examiner* — Christopher Mahoney
(74) *Attorney, Agent, or Firm* — Patterson & Sheridan, LLP

(57) ABSTRACT

An image forming apparatus includes a printer, an interface through which print data includes at least one of a first setting to form a first image with a decolorable colorant and a second setting to form a second image with a non-decolorable colorant, and a controller that determines whether the print data includes a layout setting to form a plurality of images on a sheet. If the print data includes the layout setting and only one of the first and the second setting, the printer forms the images with a corresponding one of the decolorable colorant and the non-decolorable colorant on the sheet based on the layout setting. If the print data includes the layout setting, the first setting and the second setting, the printer forms each of the first image and the second image on different sheets.

20 Claims, 14 Drawing Sheets

IMAGE FORMING APPARATUS, IMAGE FORMING METHOD, AND IMAGE FORMING SYSTEM WITH DECOLORABLE PRINTING AND NON-DECOLORABLE PRINTING

CROSS-REFERENCE TO RELATED APPLICATION

This application is based upon and claims the benefit of priority from JP application No. 2014-212955, filed on Oct. 17, 2014, the entire contents of which are incorporated herein by reference.

FIELD

Embodiments described herein relate to an image forming apparatus, image forming method and image forming system forming an image on the basis of received print data.

BACKGROUND

An image forming apparatus capable of printing images with a decolorable colorant (decolorable printing) and printing images with a non-decolorable colorant (non-decolorable printing) is known.

The image forming apparatus receives a print job (print data) from an image processing apparatus such as a personal computer and the like, and forms an image. The print job includes print settings selected by a user via printer driver at the image processing apparatus.

The decolorable printing is enables a printed sheet to be reused. However, if the image forming apparatus prints an image with the decolorable colorant on one side of a sheet and another image with the non-decolorable colorant on other side of the same sheet, the printed sheet may not be reused for duplex printing.

Thus, if a single print job includes both a decolorable printing instruction and a non-decolorable printing instruction, it would be desirable to avoid the situation described above so that the reusability of sheets is not affected.

DETAILED DESCRIPTION

In accordance with one embodiment, an image forming apparatus comprises a printer that forms an image on a sheet, an interface though which print data which includes at least one of a first setting and a second setting, is received, the first setting being a setting to form a first image with a decolorable colorant and the second setting being a setting to form a second image with a non-decolorable colorant, and a controller configured to determine whether the received print data includes a layout setting to form a plurality of images on a sheet. If the print data includes the layout setting and only one of the first setting and the second setting, the controller causes the printer to form the images with a corresponding one of the decolorable colorant and the non-decolorable colorant on the sheet based on the layout setting. If the print data includes the layout setting and both the first setting and the second setting, the controller causes the printer to form each of the first image and the second image on different sheets.

Hereinafter, embodiments will be described with reference to the drawings.

First Embodiment

Figure 1:
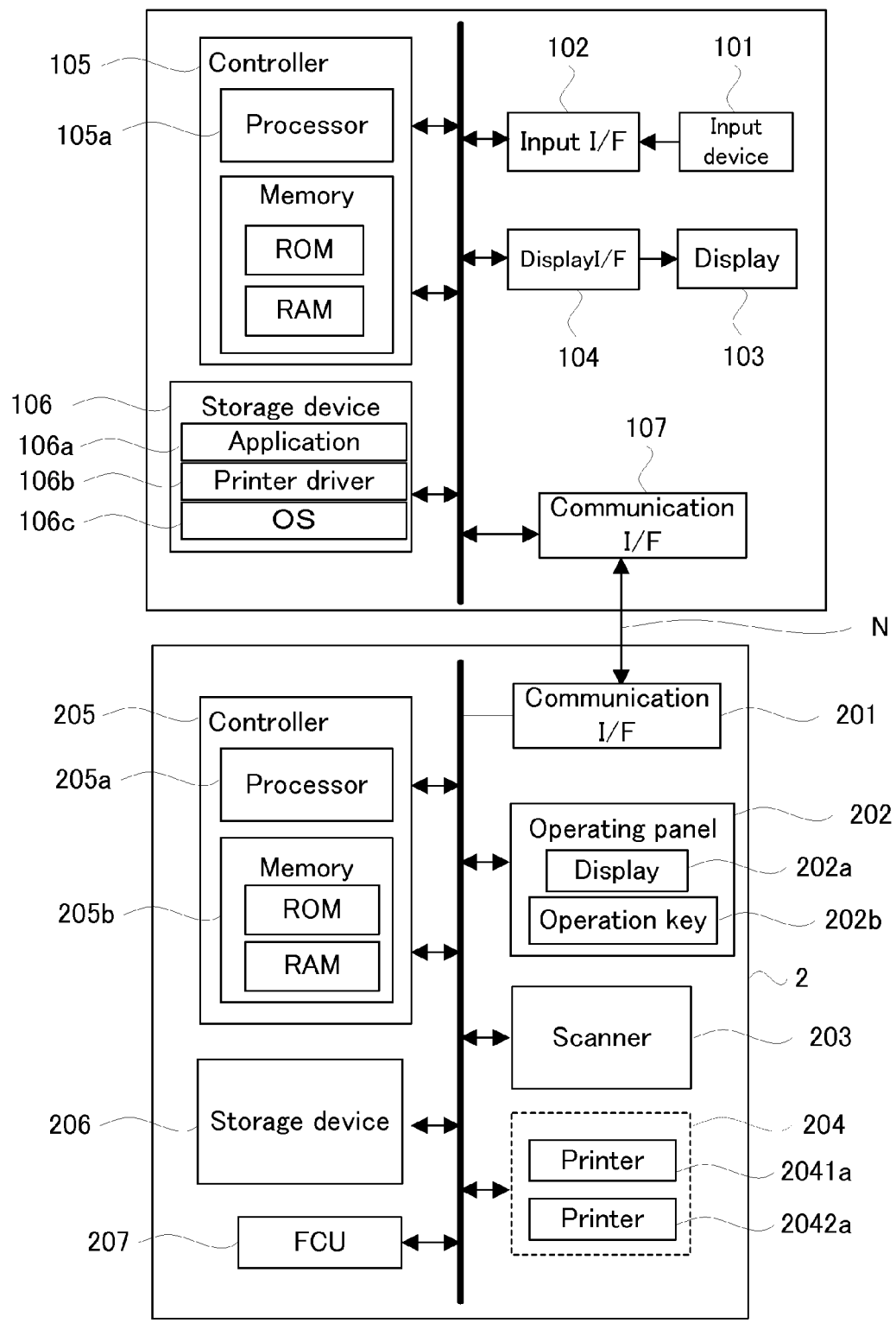
FIG. 1 is a hardware block diagram showing the configuration of a printing system including an image forming apparatus and an image processing apparatus according to a first embodiment.

FIG. 1 is a hardware block diagram showing the configuration of a printing system according to the present embodiment. The printing system includes an image processing apparatus 1 and an image forming apparatus 2a (MFP: Multi Function Peripheral). The image processing apparatus 1 and the image forming apparatus 2a are connected via a wired or wireless communication network N such as LAN (Local Area Network), Wi-Fi (Wireless Fidelity) and the like.

The image processing apparatus 1 sends a print job (print data) to the image forming apparatus 2a via the communication network N. The image forming apparatus 2a executes a print processing according to an instruction included in the received print job.

The image processing apparatus 1 is a network terminal such as PC (Personal Computer), mobile terminal like a smartphone and the like. The image processing apparatus 1 includes, for example, the following hardware elements: an input device 101, an input interface (I/F) 102, a display 103, a display I/F 104, a controller 105, a storage device 106 and a communications I/F 107.

The input device 101 is, for example, a keyboard, a mouse, a touch panel, a touchpad, a graphics tablet, or dedicated buttons. The input device 101 receives a user operation input and generates a signal based on the user operation input.

The input I/F 102 transfers the signals from the input device 101 to the controller 105.

The display 103 is, for example, an electronic paper, LCD (Liquid crystal display), EL (Electronic Luminescence), PDP (Plasma Display Panel), CRT (Cathode Ray Tube), or the like. A part or the entirety of the functions of the input device 101 and the display 103 may be implemented as a touch panel display.

The display I/F 104 transfers a display control signal based on processing by the controller to the display 103.

The controller 105 executes various processes of the image processing apparatus 1 such as, for example, arithmetic and logic processing, display control processing, print job processing, and the like. The controller 105 includes, for example, a processor 105a and a memory 105b. The memory 105b is, for example, a ROM (Read Only Memory), RAM (Random Access Memory), or the like.

The controller 105 executes various processes by executing programs stored in the memory 105b. In addition, the processor 105a may be a CPU (Central Processing Unit) or a MPU (Micro Processing Unit). Furthermore, a part or all the functions of the controller 105 may be implemented as an ASIC (Application Specific Integrated Circuit).

The storage device 106 is, for example, HDD (Hard Disk Drive), flash memory, or the like. The storage device 106 stores, for example, an application program 106a, a printer driver 106b, an operating system 106c, and various other information and data. The application program 106a includes general software and web applications. The printer driver 106b operates as software component of the operating system 106c and generates a print job to be sent to the image forming apparatus 2a based on a print instruction from the application program 106a.

A setting screen of the printer driver 106b executed by the controller 105 is displayed, for example, on the display 103 of the image processing apparatus 1.

The communications I/F 107 serves as an interface of communication processing for the image processing apparatus 1 with the image forming apparatus 2a. The communications I/F 107 communicates with the image forming apparatus 2a via an interactive wired or wireless interface such as Bluetooth®, IEEE802.15, IEEE802.11, IEEE802.3, or IEEE1284, and via an infrared communication or optical communication. Furthermore, the communications I/F 107 may includes a USB interface or a parallel interface. The controller 105 communicates with the image forming apparatus 2a, USB device, an external device, and the like via the communications I/F 107.

Next, the image forming apparatus 2a will be described. The image forming apparatus 2a includes, for example, a communications I/F 201, an operating panel 202, a scanner 203, a printer 204, a controller 205, a storage device 206, a FCU (Facsimile Control Unit), and the like.

The communications I/F 201 serves as an interface of communication processing for the image forming apparatus 2a with the image processing apparatus 1. The communications I/F 201 communicates with the image processing apparatus 1 via an interactive wired or wireless interface such as Bluetooth®, IEEE802.15, IEEE802.11, IEEE802.3, or IEEE1284, and via an infrared communication or optical communication. Furthermore, the communications I/F 201 may includes a USB interface or a parallel interface. The controller 205 communicates with the image processing apparatus 2a, USB device, an external device, and the like via the communications I/F 201.

The operating panel 202 receives a user operation input and generates a signal based on the user operation input. The operating panel 202 has a touch-screen as a display 202a and an operation key 202b. The operation key 202b includes, for example, a numeric keypad, a reset key, a stop key, a start key, and the like. The display 202a displays a variety of items to be set, for example, a print condition such as a print sheet size, a number of copies, a density, a finishing (stapling or holding), and the like. The instructions of the displayed items will be inputted via the display 202a.

The scanner 203 includes a scanning unit reading an original as an image, a platen plate, and an automatic document feeder feeding the original to a reading position. The scanning unit of the scanner reads the image of the original set on the platen plate or the automatic document feeder.

The printer 204 forms an image corresponding to the image of the original read by the scanner 203 or an image corresponding to an image data sent from the image processing apparatus 1 on a sheet. The printer 204 includes a printer 2041a and printer 2042a.

The printer 2041a serves as an image forming device capable of forming an image (decolorable printing) with a decolorable colorant (decolorable material) which can be decolored or become colorless. Here, the decolorable colorant is a toner or ink which can be decolored or become colorless when it is heated to a predetermined temperature, for example, a dye such as a leuco dye. Alternatively, the decolorable colorant may be a material which can be decolored by use of a chemical or by being subjected to light. In addition, the decoloring in the present embodiment is not limited to a decoloring process in which the decolorant is decolored by a chemical reaction. The decoloring process may include scraping physically an image on a sheet.

Furthermore, the decoloring in the present embodiment refers to making the image (which is formed in a color including not only chromatic colors but also monochromatic color such as white color, black color and the like) that has a color that is different from the background color of the paper, not visible or hard to see. Herein, making the image not visible may include changing the image that has been formed in a color different from the background color of the paper to a color which is the same as or approximately the same as the background color of the paper.

The printer 2042a serves as an image forming device capable of forming an image (non-decolorable printing) with a non-decolorable colorant which cannot be decolored or become colorless. Here, the non-decolorable colorant (material), unlike the above-described decolorable colorant, maintains its color even after it is heated or used chemical or subjected to light.

The controller 205 carries out various processes of the image forming apparatus 2a such as, for example, an arithmetic and logic processing, a display control processing, processing of a print job, a print processing, a sheet conveying processing, and the like. The controller 205 includes, for example, a processor 205a and a memory 205b. The processor 205a may be a CPU or an MPU and the memory 205b may include a ROM, RAM, and the like.

The controller 205 also has a role in executing various functions by executing a program read from the storage device 206 and stored in the memory 205b. The controller 205 controls the operating panel 202, the scanner 203, the printer 2041a, 2042a, a Facsimile Control Unit (FCU) 207 based on a control program stored in RAM, ROM or storage device 206. A part or all of the functions of the controller 205 may be implemented as an ASIC.

The storage device 206 is, for example, a magnetic-storage device such as HDD, an optical storage device, a semiconductor memory device (flash memory), and the like. The storage device 206 temporarily stores, for example, an image data of a print job received from the image processing apparatus 1 via the communications I/F or an image data scanned by the scanner 203. Furthermore, the storage device stores, for example, various programs to be executed in the image forming apparatus 2a (for executing a copy function, a print function, a scanning function, a facsimile function, a network filing function, etc.) and various settings.

In the print system including the image processing apparatus 1 and the image forming apparatus described above, the image processing apparatus 1 generates a print job using the printer driver 106b, according to the user operation input. The print job is sent to the image forming apparatus 2a. Then the controller 205 of the image forming apparatus 2a analyzes the print job and executes the print processing according to the print job on at least one of the printer 2041a and printer 2042a. The printer driver 106b may send a print job to the image forming apparatus 2a directly, or indirectly through a print server (not shown) on the network. In the case where the printer server is used, the print job is stored in the print server temporarily. Then if the print server receives an instruction generated by the user operating input via the operation panel 201 from the image forming apparatus 2a or an instruction from the image processing apparatus 1, the print job stored in the print server is transmitted to the image forming apparatus 2a.

The image forming apparatus 2a performs a print processing by using one of the printer 2041a and the printer 2042a, or both of the printer 2041a and the printer 2042a in order to form an image on a single sheet.

A setting screen of the printer driver 106b is displayed, for example, on the display 103 of the image forming apparatus 1.

Figure 2A:
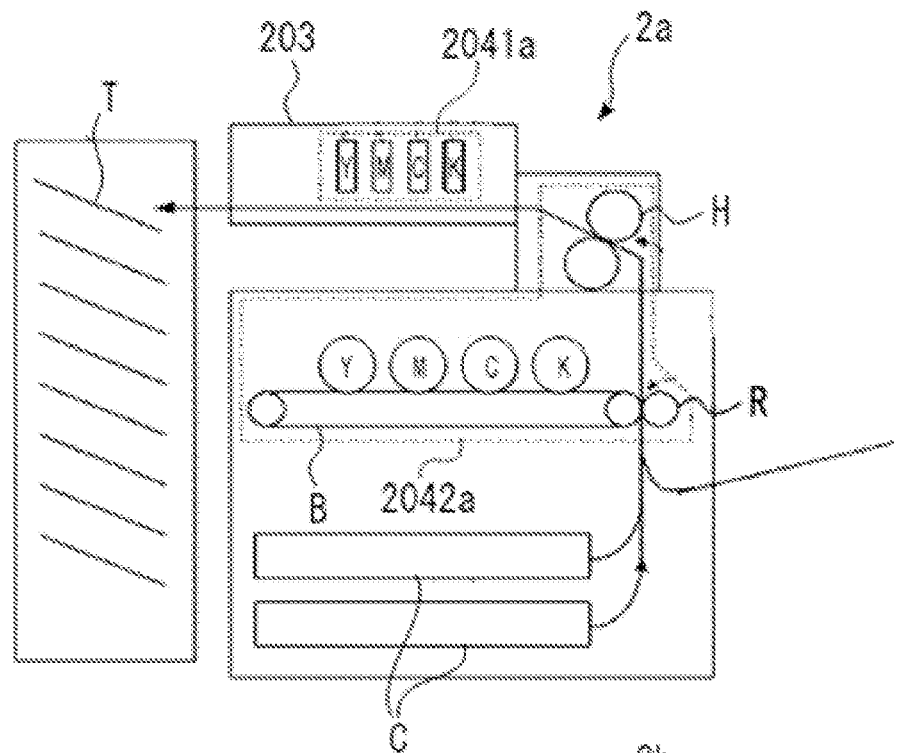
FIGS. 2A and 2B are diagrams showing the configuration of the image forming apparatus according to the first embodiment.

FIG. 2A is a diagram showing the configuration of the image forming apparatus 2a according to the first embodiment.

As shown in FIG. 2A, the image forming apparatus 2a includes the printer 2041a and the printer 2042a. The printer 2041a forms images by an ink jet method by using a decolorable ink as the decolorable colorant. The printer 2042a forms images by a general electrophotographic method by using a toner as the non-decolorable colorant.

The image forming operation of the image forming apparatus 2a according to the present embodiment will be described. Then, the operation in which the printer 2042a using a general toner forms images will be explained. First, the image forming apparatus 2a obtains a copy job which is generated based on an image scanned by the scanner 203 or a print job which is received from an external device. According to the copy job or print job, a toner image formed on a photoconductor of the printer 2042a is transferred onto a belt surface of an intermediate transfer belt B. The toner image transferred onto the intermediate transfer belt B is transferred onto a sheet fed from a sheet cassette C or a manual tray. The image transferred onto the sheet is fixed by a fixing device H, and then the sheet is discharged through printer 2041a to a stack tray T.

Next, the operation in which the printer 2041a using the decolorable ink as decolorable colorant toner forms images will be explain. The image forming apparatus 2a obtains a copy job which is generated based on an image scanned by the scanner 203 or a print job which is received from an external device. According to the copy job or print job, the printer 2041a forms an ink image on a sheet fed from the sheet cassette C or the manual tray. The sheet having the ink image formed with the decolorable colorant is discharged to the stack tray T.

The image forming apparatus 2a according to the present embodiment may form an image on a single sheet by using both the printer 2041a and the printer 2042a. In such a case, the printer 2041a forms an image on the sheet printed by the printer 2042a, and then the sheet is discharged to the stack tray T.

In addition, the printer 2041a and the printer 2042a are not limited to the types described above. For example, the printer 2041a could print by a general electrophotographic method and the printer 2042 could print by an ink jet method. Also both the printer 2041a and the printer 2042a could print by an ink jet method.

Figure 2B:
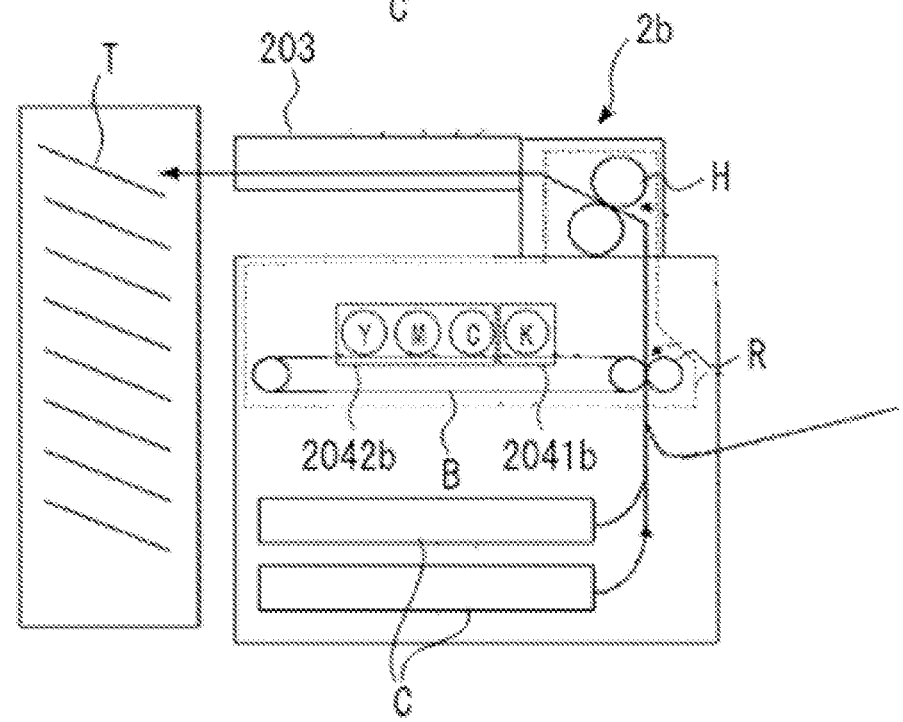

FIG. 2B is a diagram showing the configuration of the image forming apparatus 2b as another example of an image forming apparatus according to the first embodiment.

In FIG. 2A, the printer 2041a and the printer 2042a are located at different sides of the fixing device H in a sheet conveying direction but there may be other configurations. In case of using a multiple tandem method, for example, as shown in FIG. 2B, both the printer 2041a and the printer 2042a could form an image on the intermediate transfer belt B. Of course, the number of print units distributed along the intermediate transfer belt B is not limited to four units, but it could be five units or more.

Accordingly, as shown in FIG. 2B, the image forming apparatus 2b has a printer 2041b which can form an image with a K (black) toner as the decolorable colorant and a printer 2042b which can form an image with a plurality of colors, e.g., Y (Yellow), M (Magenta), and C (Cyan). The number of different colors may be less or more than in the example shown in FIG. 2B. Furthermore, the printing method is not limited to the multiple tandem method, but it could be a revolver method in which the color units are located along a rotating device.

Next, with reference to FIG. 3 to FIG. 6, a method for setting a print setting according to the first embodiment will be explained.

Figure 3:
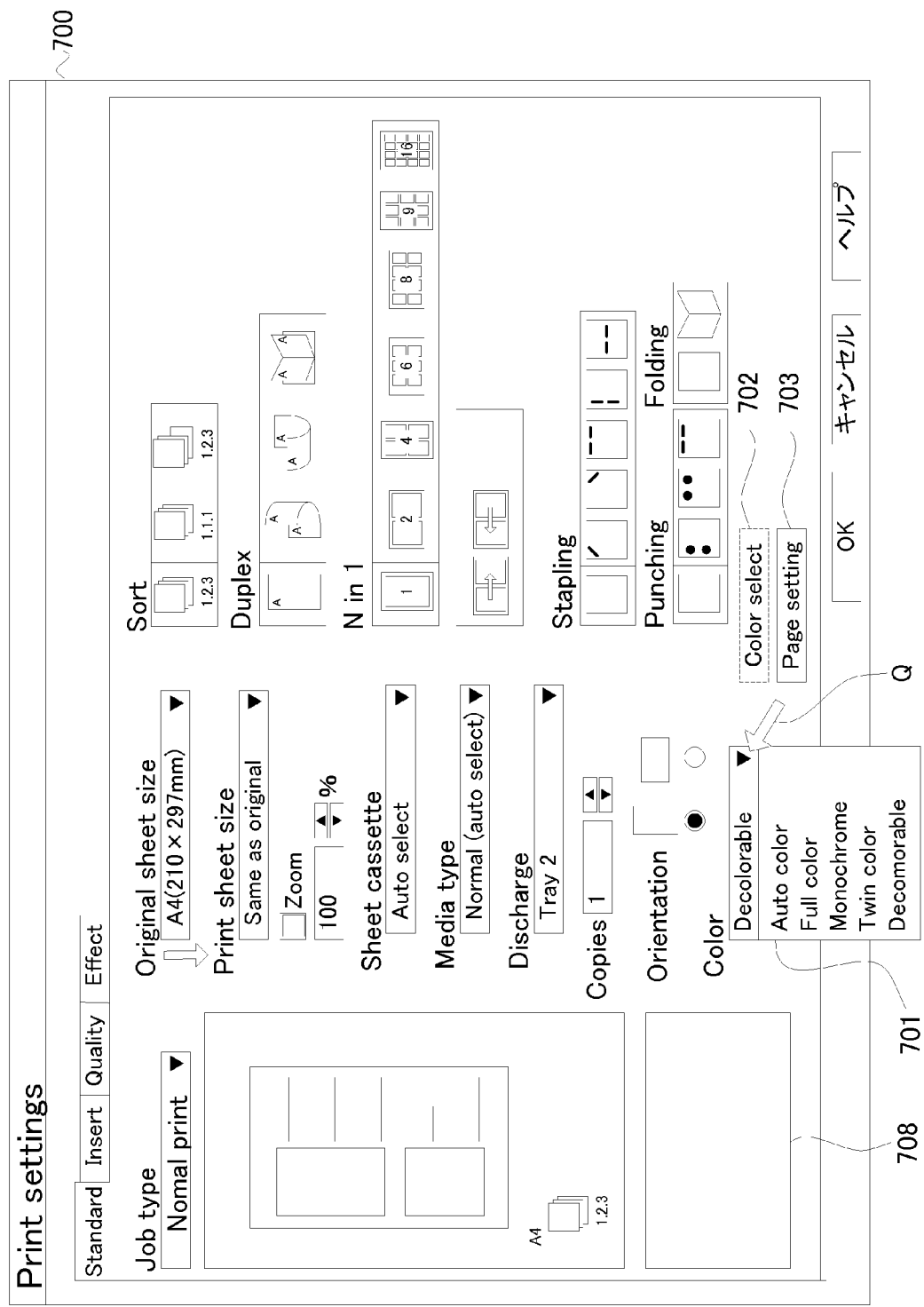
FIG. 3 illustrates a setting screen of a printer driver program executed by the image processing apparatus according to the first embodiment, before pages for decolorable printing are set.
Figure 4:
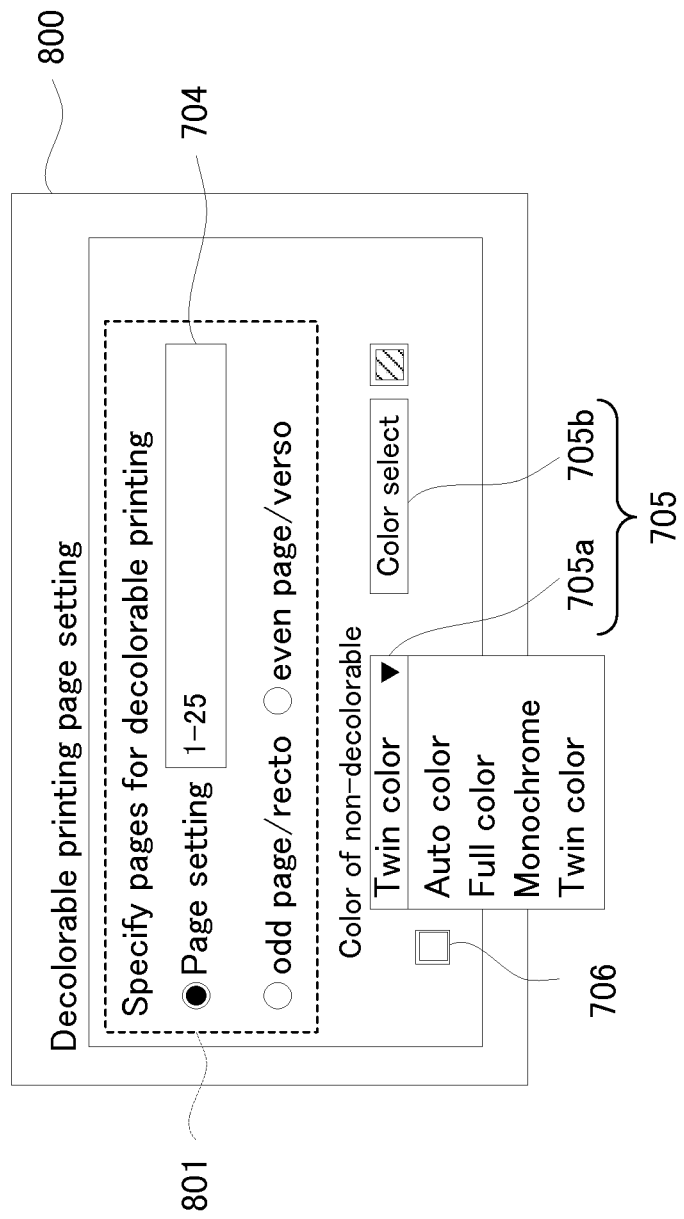
FIG. 4 is an example of a setting screen for setting pages for decolorable printing according to the first embodiment.
Figure 5:
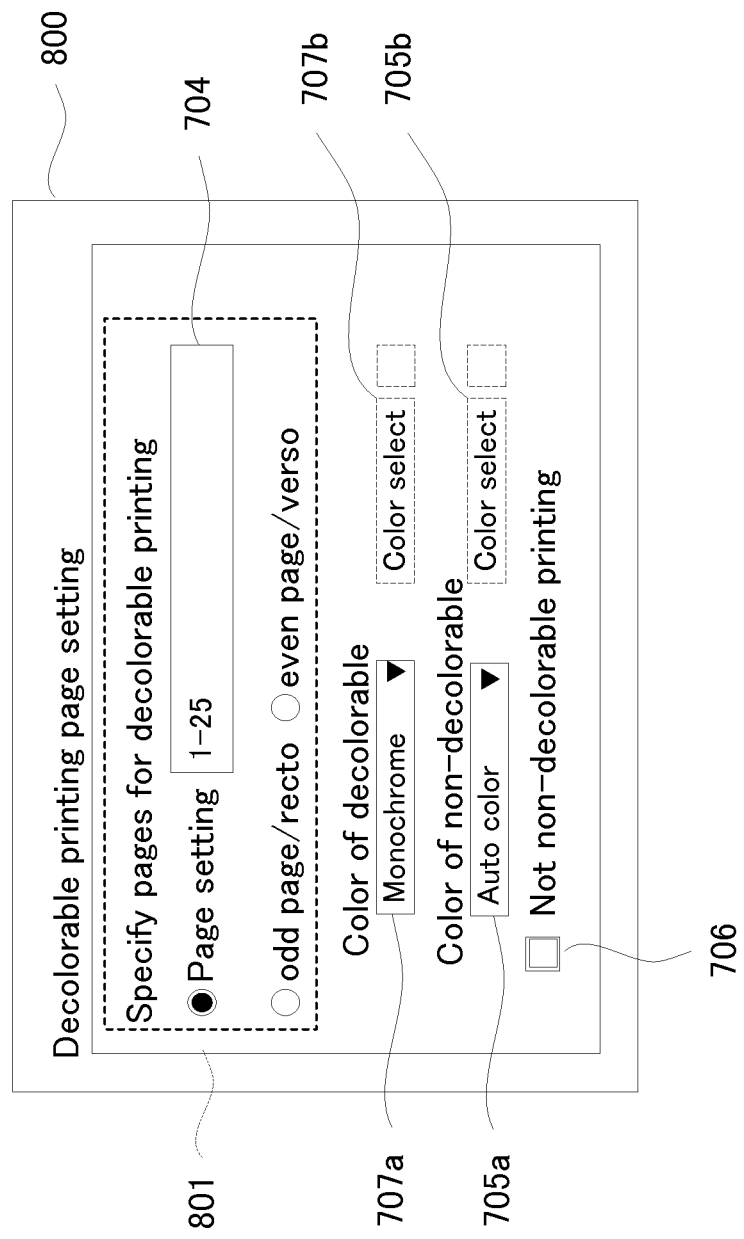
FIG. 5 is another example of a setting screen for setting pages for decolorable printing according to the first embodiment.

FIG. 3 is an example of an operating screen 700 of printer driver 106b executed by the controller 105 of the image processing apparatus 1. FIG. 4 and FIG. 5 are examples of a setting screen for setting pages for decolorable printing. The setting screen shown in FIG. 4 or FIG. 5 is displayed on the display 103 when a page setting button 703 of FIG. 3 is selected.

The controller 105, for example, via the operating screen 700 shown in FIG. 3, receives a color setting of a print job to be generated, and determines if the received color setting indicates the decolorable printing. Here, the operating screen 700 of the printer driver 106b is, for example, displayed on the display 103 of the image processing apparatus 1.

The operating screen 700 according to present embodiment includes a color setting menu 701. According to the selection made in the color setting menu 701, a color setting for printing is set. The color setting menu 701, for example, is implemented as a pull-down menu (See Arrow Q shown in FIG. 4). According to present embodiment, the selections in the color setting menu 701 include auto color, full color, monochrome (black & white or grayscale), twin color, and decolorable.

The printer driver 106b generates a print job based on the settings selected in the operation screen 700 and an image data of an object to be printed. The printer driver 106*b* has setting buttons for number of copies, original sheet size, print sheet size, scale rate for printing an original on a sheet, sheet cassette, media type, sort, duplex print setting, N-in-1 setting, stapling setting, punching setting, and the like. The printer driver 106*b* sends the generated print job to the image forming apparatus 2*a*. The image forming apparatus 2*a* receives the print job and prints an image based on the image data and various settings included in the received print job.

If the print job has an auto color setting, the image forming apparatus 2*a* determines if the image data as a printing object includes color data other than black. The image forming apparatus 2*a* performs full color printing if the image data includes color data other than black, and if not, performs monochrome printing. If the print job has full color setting, the image forming apparatus 2*a* performs full color printing by using plural colors (for example, Y, M, C, K) regardless of color data of the image data. If the print job has monochrome setting, the image forming apparatus 2*a* performs monochrome printing by using only black colorant. If the print job has twin color setting, the image forming apparatus 2*a* performs a printing by two colors (print color) selected on the operation screen 700 of the printer driver 106*b*. If the print job has decolorable setting, the image forming apparatus 2*a* performs the decolorable printing by using a decolorable colorant.

The image forming apparatus 2*a* can form an image with plural decolorable colorants. For example, if the image forming apparatus 2*a* has a black decolorable colorant and a blue decolorable colorant, the color setting menu 701 displays decolorable (K) and decolorable (Blue) as color settings that are selectable.

If the decolorable setting is selected through the color setting menu 701, the controller 105 receives as a first setting the setting information indicating the decolorable printing. FIG. 3 shows an image of operation screen 700 in which the decolorable setting is selected through the color setting menu 701.

A color select button 702 becomes selectable when the twin color setting is selected through the color setting menu 701. If the twin color setting is not selected through the color setting menu 701, the color select button 702 is displayed in gray (dash line in FIG. 3) and cannot be selected. If the color select button 702 is selected, a color select screen in which the user can select colors is displayed.

A page setting button 703 is a button icon to be selected to set pages for decolorable printing. The pages for decolorable printing are set in order to generate a print job including both pages for the decolorable printing and for the non-decolorable printing.

The controller 105 determines if a page setting is set. For example, the controller 105 determines the page setting is not set when the page setting button 703 is not selected even through the decolorable setting is selected through the color setting menu 701. In such a case, the controller 105 sets all pages of a document for decolorable printing.

On the other hand, if the setting button 703 is selected, a setting screen 800 or 800', for example, shown in FIG. 4 and FIG. 5, is displayed on the display 103. Each setting screen 800 and 800' according to present embodiment shown in FIG. 4 and FIG. 5 shows an example in which a single color of the decolorable colorant can be used. For example, a case in which single color of the decolorable colorant can be used includes a case in which the image forming apparatus 2*a* includes only one decolorable colorant cartridge like a toner or ink, or a case in which only one of decolorable colorant cartridges is available and the other decolorable colorant cartridges become empty, or the like.

As shown in FIG. 4, the setting screen 800 includes a page setting section 801. The page setting section 801 receives an input specifying range of pages (first page range) of a document to be printed with the decolorable colorant. The setting screen 800 shows setting items which includes, for example, page addressing, odd page/recto, even page/verso and the like as the page setting section 801. The page setting section 801 receives one of the setting items input. If the setting item of page addressing which specify range of pages by page number is selected, the page numbers for the decolorable printing can be inputted in a text box 704 corresponding to page addressing.

If range of pages is specified, for example, a description like 1-25 is inputted in the text box 704 and if each page is specified individually, a description like 1, 5, and 9 is inputted.

The controller 105 receives range of pages (first page range) as a page setting, which is printed with the decolorable colorant.

The controller 105 determines whether the color setting or print color for printing with the non-decolorable colorant is set. Here, if the color setting or print color for the non-decolorable printing is set, the controller 105 receives a second setting as setting information for the non-decolorable printing. The second setting includes information of the color setting or print color. The second setting is applied to other range of pages (second page range) which is other than the range of pages (first page range) selected to be printed with the decolorable colorant.

Meanwhile, if the color setting or a print color for the non-decolorable printing is not set by a user, the controller 105 receives a default setting of the color setting or print color for the non-decolorable printing as the second setting.

The controller 105 generates a print job including a print setting to form images of the first page range with the decolorable colorant based on the first setting and to form images of the second page range with the non-decolorable colorant based on the second setting.

Furthermore, if the odd page/recto is selected on the setting screen 800, the controller 105 generates a print job for causing the image forming apparatus 2*a* to form images of odd pages with the decolorable colorant and to form images of other pages which are not selected with the non-decolorable colorant.

The setting screen shown in FIG. 4 has a non-decolorable color setting section 705 which receives an input specifying a color setting for the non-decolorable printing. The non-decolorable color setting section 705 has a color setting menu 705*a* and a color select button 705*b*. Through the color setting menu 705*a*, one of auto-color, full color, monochrome and twin-color may be selected. An explanation of these color settings is as the same as provided above. If the color setting is selected in the non-decolorable color setting section 705, an image of a page in the second page range is formed with non-decolorable colorant based on the selected color setting. The color select button 705*b* is used in order to select a color via a color palette and the like if twin color is selected through the color setting menu 705*a*. The selected color is displayed adjacent to the color select button 705*b*. If a color setting other than twin color is selected through the color setting menu 705*a*, the color select button 705*b* is displayed in gray color and cannot be selected.

As mentioned above, the pages which are inputted in the text box 704 (FIG. 4) are subject to the decolorable printing and the other pages which are not designated in the text box 704 are subject to the non-decolorable printing. However, the present embodiment is not limited to this. For example, the pages which are inputted in the text box 704 could be subject to the non-decolorable printing and the other pages could be subjected to the decolorable printing. That is to say, the controller 105 may receive the first setting as setting information indicating the non-decolorable printing, the first page range as the page setting which are printed based on the first setting and the second setting as a setting information indicating the decolorable printing corresponding to the second page range different from the first page range.

In addition, pages which are not printed can be removed from a print job by requiring pages which are printed to be designated via a print program of various applications such as document creation software or spreadsheet software and the like. Moreover, by designating both pages for the decolorable printing and pages for the non-decolorable printing, the other pages which are not designated could be prevented from printing.

The printer driver 106b of the present embodiment, by executing the settings process mentioned above, can generate a single print job including pages for the decolorable printing and pages for the non-decolorable printing.

As mentioned above in FIG. 4, the example of the setting screen 800 which does not have a function for selecting a color for the decolorable printing is explained because one color for the decolorable printing is available in the image forming apparatus 2a. However, it is not limited to this. The setting screen 800 can includes a function to select a color for the decolorable printing if the image forming apparatus 2a has cartridges corresponding to a plurality of different colors of decolorable colorant.

For example, as the cartridges corresponding to a plurality of different colors of decolorable colorant, the combination of the decolorable cartridges such as Black (K) and Blue (B), YMC, YMCK or CK and the like can be implemented. The combination of the decolorable cartridges is not limited to above-mentioned example and a variety of combinations can be implemented. In addition, a decolorable cartridge with a different color from Y, M, C, K or B could be used.

For example, a setting screen 800' shown in FIG. 5 is available for selecting not only a print color of the non-decolorable printing but also a print color of the decolorable printing. A color setting menu 707a in FIG. 5 includes selectable items for color setting, and is implemented as a pull-down menu. The items for color setting of the color setting menu 707a depend on a combination of the cartridges implemented in the image forming apparatus 2a.

A color select button 707b selects a print color to be used for printing if twin color is selected through the color setting menu 707a. If the print color is selected, the selected print color is displayed in a square area next to the color select button 707b. If twin color is not selected through the color setting menu 707a, the color select button 707b is displayed in gray and cannot be selected. The color setting menu 705a and the color select button 705b functions in the same way as explained above, and so the description thereof is omitted. In addition, if a checkbox 706 is selected, the non-decolorable printing is not performed. Namely, pages which are not set in the page setting section 801 for decolorable printing are not printed.

Figure 6:
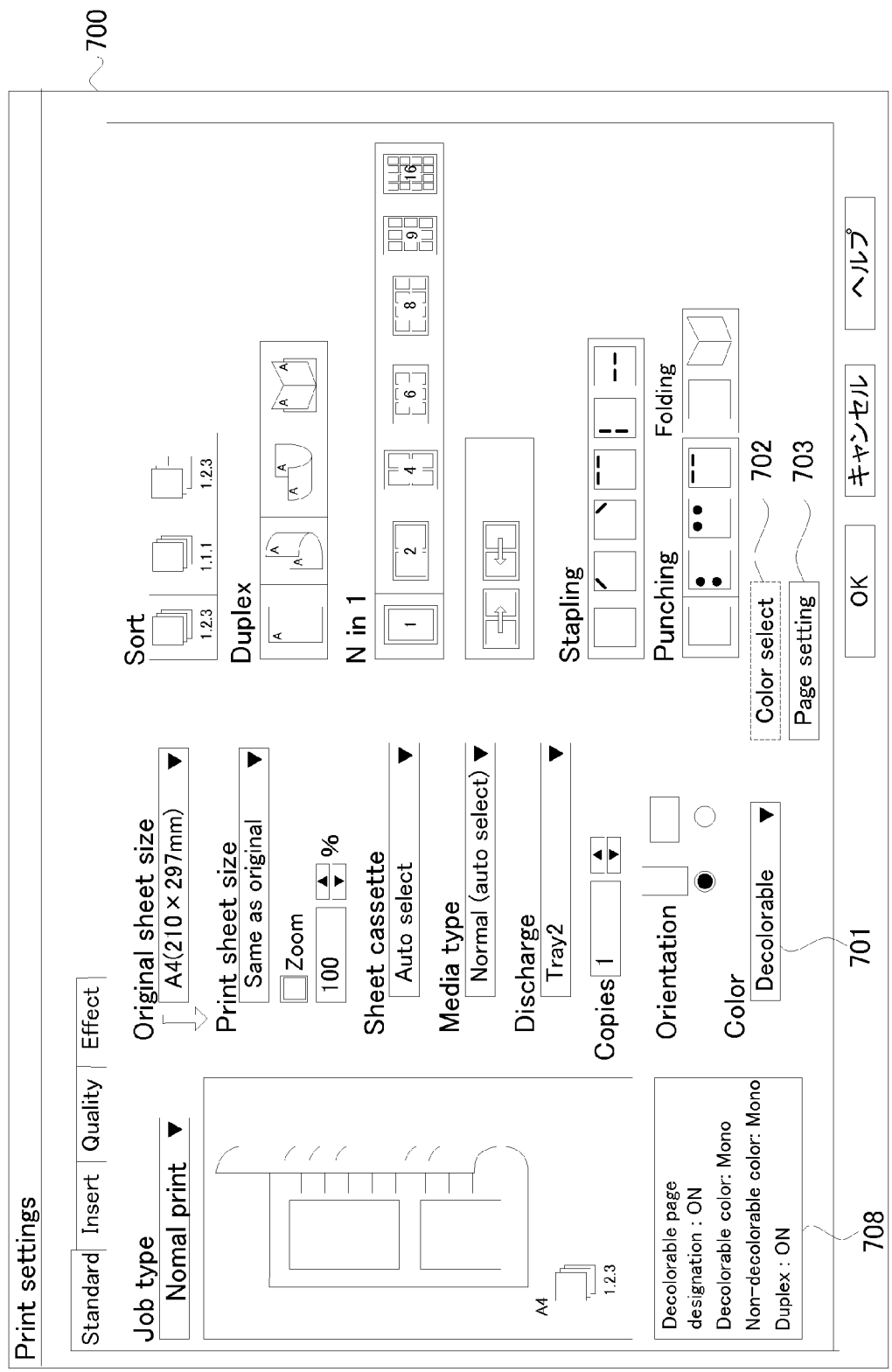
FIG. 6 illustrates the setting screen of the printer driver program executed by the image processing apparatus according to the first embodiment, after pages for decolorable printing are set.

FIG. 6 illustrates the setting screen of the printer driver 106b, after the pages for the decolorable printing are set. The setting screen 700 displayed by the printer driver 106b includes a setting list display 708 which displays print setting list when the page addressing of the decolorable printing is set. The setting list display 708 notifies that the print setting of a single print job which includes pages for the decolorable printing and pages for the non-decolorable printing, is set. For example, the setting list display 708 shown in FIG. 6 displays information of a decolorable page designation:ON, decolorable color: monochrome and non-decolorable color: monochrome. Information displayed by the setting list display 708 can be a message or icon which indicates that the print setting of a single print job which includes pages for the decolorable printing and pages for the non-decolorable printing, is set.

In addition, the setting list display 708 can display other print settings such as a duplex print setting, a N-in-1 setting, a stapling setting and the like. For example, FIG. 6 shows a state in which a duplex print setting is also set. And the setting screen of the printer driver 106b is not limited to the embodiment displayed on the display 103 of the image processing apparatus 1. For example, the setting screen of the printer driver 106b can be displayed on a display of other external device which is different from the image processing apparatus in which the printer driver 106b is installed.

If an OK key is selected, the print setting is finished. The printer driver 106b generates a print job according to the print setting and transmits the print job to the image forming apparatus 2a. As mentioned above, if the print job which includes both page for the decolorable printing and page for the non-decolorable printing is sent to the image forming apparatus 2a, the image forming apparatus 2a prints based on the print setting of the print job.

Herein, if the print job which includes pages of the decolorable printing and pages for the non-decolorable printing has a setting of duplex print, the image forming apparatus may form an image (first image) with the decolorable colorant on one side (for example, recto) of a single sheet and form an image (second image) with the non-decolorable colorant on the other side (for example, verso). In such a case, if a decoloring process in which an image (or color of image) formed with the decolorable colorant is decolored, is performed, the image of the decolorable colorant on the one side of the sheet is decolored but the image of the non-decolorable colorant remains on the other side of the sheet. Therefore, the sheet will be non-reusable for at least duplex print.

In view of the above, the image forming apparatus according to the present embodiment receives a print job which includes a plurality of images of a document and a layout setting to form the plurality of images on a single sheet. If the print job includes one of the first setting to form image as the first image with the decolorable colorant and the second setting to form image as the second image with non-decolorable colorant, the image forming apparatus prints the received image according to the layout setting. On the other hand, if the print job includes the first setting and the second setting, the image forming apparatus prints each of the first image and the second image on different sheets. In other words, the image forming apparatus forms the first image with the decolorable colorant on a first sheet and forms the second image with non-decolorable colorant on a second sheet different from the first sheet.

According to present embodiment, the first setting which indicates the decolorable printing to form image with the decolorable colorant, includes a decolorable color setting such as shown in FIG. 4 or the print color of the decolorable printing shown in FIG. 5, and the like. In addition, the second setting which indicates the non-decolorable printing to form image with the non-decolorable colorant, includes the color setting such as auto color, full color, monochrome, twin color and the like, as shown in FIG. 4.

Figure 7:
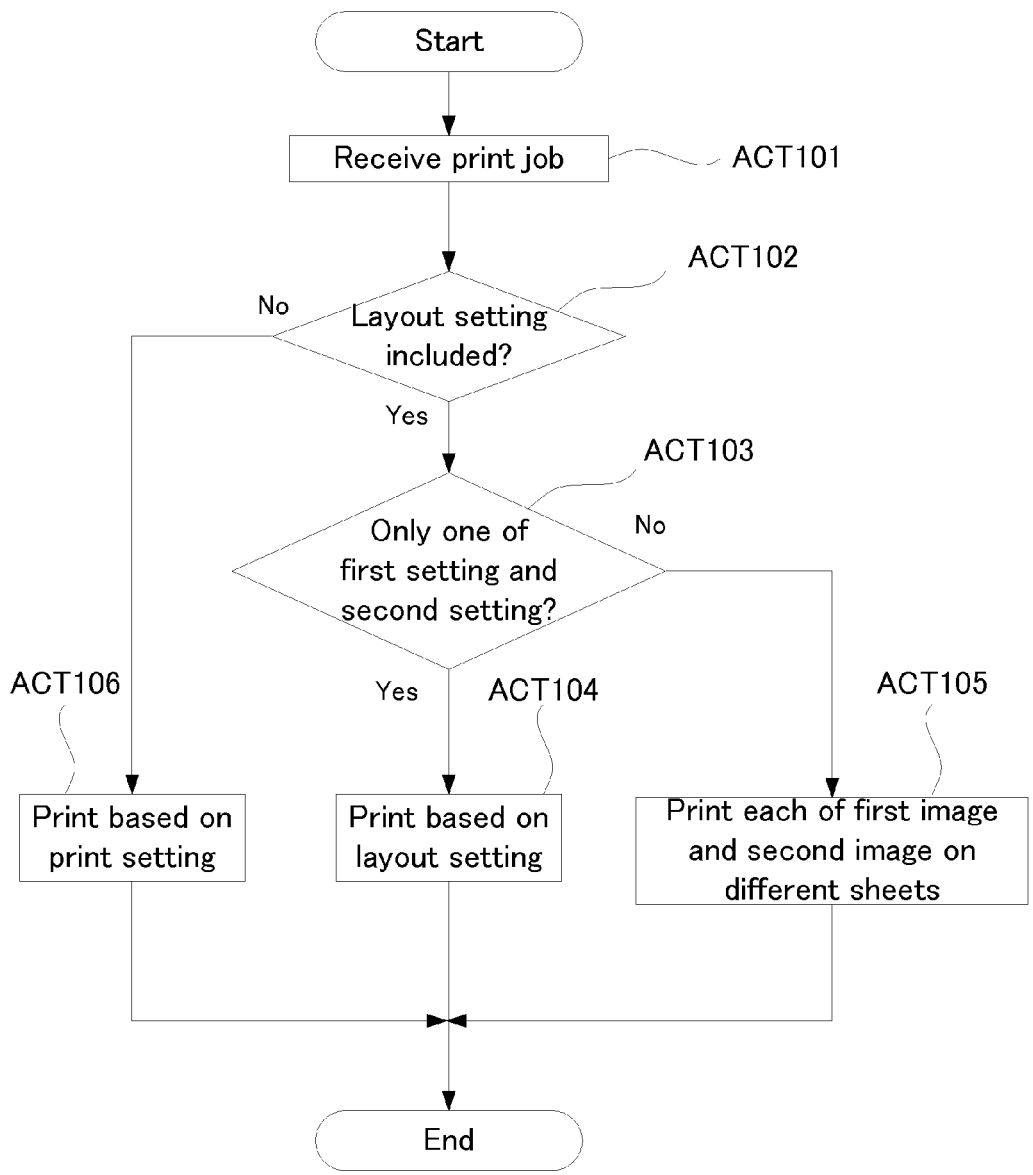
FIG. 7 is a flowchart showing the flow of one example of an image forming process carried out by the image forming apparatus, according to the first embodiment.

Next, a processing of the image forming apparatus according to present embodiment will be described. FIG. 7 is a flowchart showing the flow of an image forming processing by the image forming apparatus.

The image forming apparatus receives a print job. More specifically, the communications I/F 201 of the image forming apparatus 2a receives the print job which is sent from the image processing apparatus 1. The controller 205 of the image forming apparatus 2a receives at least one of the first setting which indicates the decolorable printing to form an image as the first image with the decolorable colorant and the second setting which indicates the non-decolorable printing to form an image as the second image with the non-decolorable colorant.

At ACT 102, the controller 205 determines whether the received print job includes the layout setting to form the plurality of images on a single sheet. Here, the layout setting includes the duplex print setting to form images of a plurality of pages on a first side and a second side of a single sheet and the N-in-1 setting to form images of a plurality of pages (N pages) on one side of a single sheet.

If the print job includes the layout setting (ACT 102, Yes), the controller 205 determines whether the print job includes only one or both of page image to be formed with the decolorable colorant and page image to be formed with the non-decolorable colorant. More specifically, the controller 205 determines whether the print setting of the print job includes only one or both of the first setting and the second setting (ACT 103).

If the print setting includes only one of the first setting and the second setting (ACT 103, Yes), the controller 205 executes a print processing based on the layout setting. The controller 205 performs one of the decolorable printing and the non-decolorable printing (ACT 104).

If the print setting includes both the first setting and the second setting (ACT 103, No), the controller 205 causes the printer 204 to print each of the first image by the decolorable colorant and the second image by the non-decolorable colorant on different sheets (ACT 105).

In addition, if the print job does not include the layout setting (ACT 102, No), the controller 205 causes the printer 204 to print image based on the print setting of the received print job (ACT 106). In this case, reusability of sheets is not affected.

Figure 8:
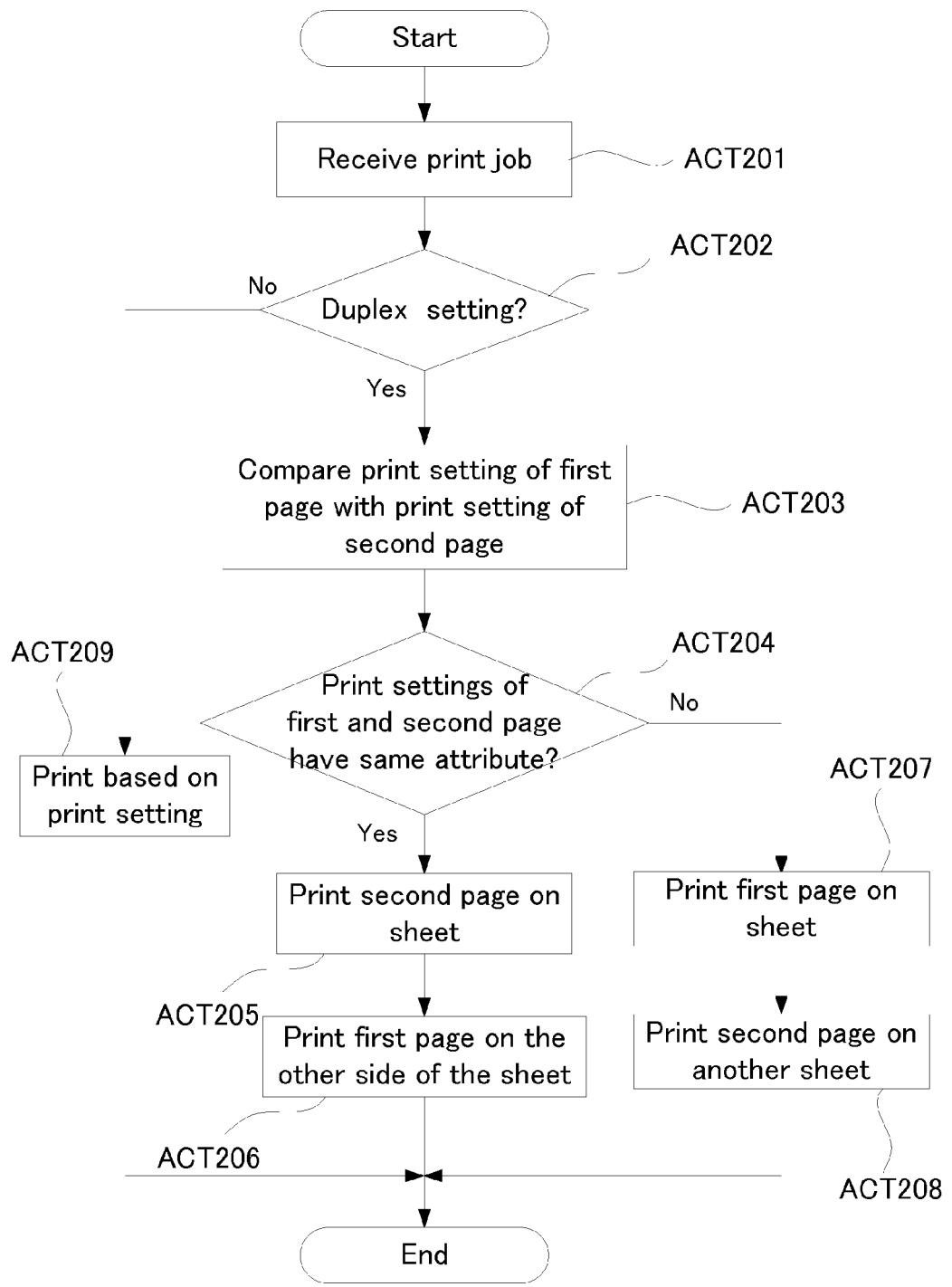
FIG. 8 is a flowchart showing the flow of another example of an image forming process carried out by the image forming apparatus, according to the first embodiment.

Next, with reference to FIG. 8, the processing of the image forming apparatus which receives the duplex print setting as the layout setting will be explained. FIG. 8 is a flowchart showing the flow of an image forming apparatus.

If the image forming apparatus receives a print job which has a print setting including the duplex print setting and both the first setting to form image with the decolorable colorant and the second setting to form image with non-decolorable colorant, the image forming apparatus compares whether the print setting of an image to be form on a first side of a sheet and the print setting of an image to be form on a second side of the sheet are same. If the print settings of the two are different, the image forming apparatus forms each of the first and second images on different sheets (layout change). On the other hand, if the print settings of the two images which are formed on the first side and the second side of the sheet are same, for example, both print settings are for only one of the decolorable printing and non-decolorable printing, the image forming apparatus executes duplex printing.

More specifically, the controller 205 compares a print setting of an image data of a first page of a print job with a print setting of an image data of a second page of the print job and determines whether the print settings (colorant attribute) of the first page image and the second page image have the same attribute. Herein, the attribute means the decolorable colorant or non-decolorable colorant. For example, the settings for the decolorable printing shown in FIG. 4 and the print color of the decolorable printing shown in FIG. 5 are decolorable attributes (first setting). On the other hand, the settings of the auto color, the full color, the monochrome and the twin color shown in FIG. 4 are non-decolorable attributes (second setting).

In FIG. 8, the image forming apparatus 2a receives a print job (ACT 201). Specifically, the communication I/F 201 of the image forming apparatus 2a receives the print job sent from the image processing apparatus 1. And the controller 205 receives a print setting of page image included in the print job.

At ACT 202, the controller 205 determines whether the received print job includes the duplex print setting as the layout setting.

If the print job includes the duplex print setting (ACT 202, Yes), the controller 205 compares a print setting of an image data of a first page with a print setting of an image data of a second page (ACT 203). That is to say, if the print job has four pages to be formed, the controller 205 compares image of page 1 with image of page 2 and compares image of page 3 with image of page 4.

At ACT 204, the controller 205 determines whether the print setting of the first page and the print setting of the second page are print settings having the same colorant attribute. Specifically, for example, if the print setting for the first page indicates the decolorable colorant and the print setting for the second page also indicates the decolorable colorant, the controller 205 determines that the print settings of the first page and the second page have the same colorant attribute.

If the controller 205 determines that the print settings of the first page image and the second page image have the same colorant attribute (ACT 204, Yes), the controller 205 executes print processing to print image of the second page on one side of a sheet (ACT 205) and to print image of the first page on the other side of the sheet (ACT 206). That is to say, if both print settings of the first page and the second pages are one of the first setting to form image as the first image with the decolorable colorant (the decolorable printing) and the second setting to form image as the second image with non-decolorable colorant (the non-decolorable printing), the controller 205 prints the first image of the first page and the second image of the second page on both sides of a sheet based on the duplex print setting.

On the other hand, if the controller 205 determines that the print settings of the first page image and the second page image have different colorant attributes (ACT 204, No), the controller 205 prints processing to print image of the first page on a sheet (ACT 207) and then prints image of the second page on another sheet (ACT 208). Namely, if the print setting of the first page is one of the first setting and the second setting and the print setting of the second page is the other of the first setting and the second setting, the controller 205 causes the printer 204 to print the first page image and the second page image on different sheets.

In addition, if the print job does not include the duplex print setting as the layout setting (ACT 202, No), the controller 205 causes the printer 204 to print image based on the print setting of the received print job (ACT 209).

According to the present embodiment, if the image processing apparatus generates a print job which includes the decolorable printing and the non-decolorable printing, the image forming apparatus can prevent the image of the decolorable colorant and the image of the non-decolorable colorant from being formed on the same sheet. Therefore, it is able to decrease the number of sheets having an image formed by decolorable printing that are not reusable.

Second Embodiment

The embodiment is another variation of the first embodiment shown in FIG. 8. In the following, the same configuration as the above-described first embodiment will be denoted by the same reference numerals and description thereof will be omitted. Hardware configuration of the present embodiment can be same configuration as the first embodiment.

The image forming apparatus according to the first embodiment compares the images of two pages. However in the present embodiment, if it is determined that the print settings of the first page and the second page have different attributes as a result of comparison, the image forming apparatus prints the first page and determines whether the print setting of the second page and the print setting of the third page have the same attribute.

Figure 9:
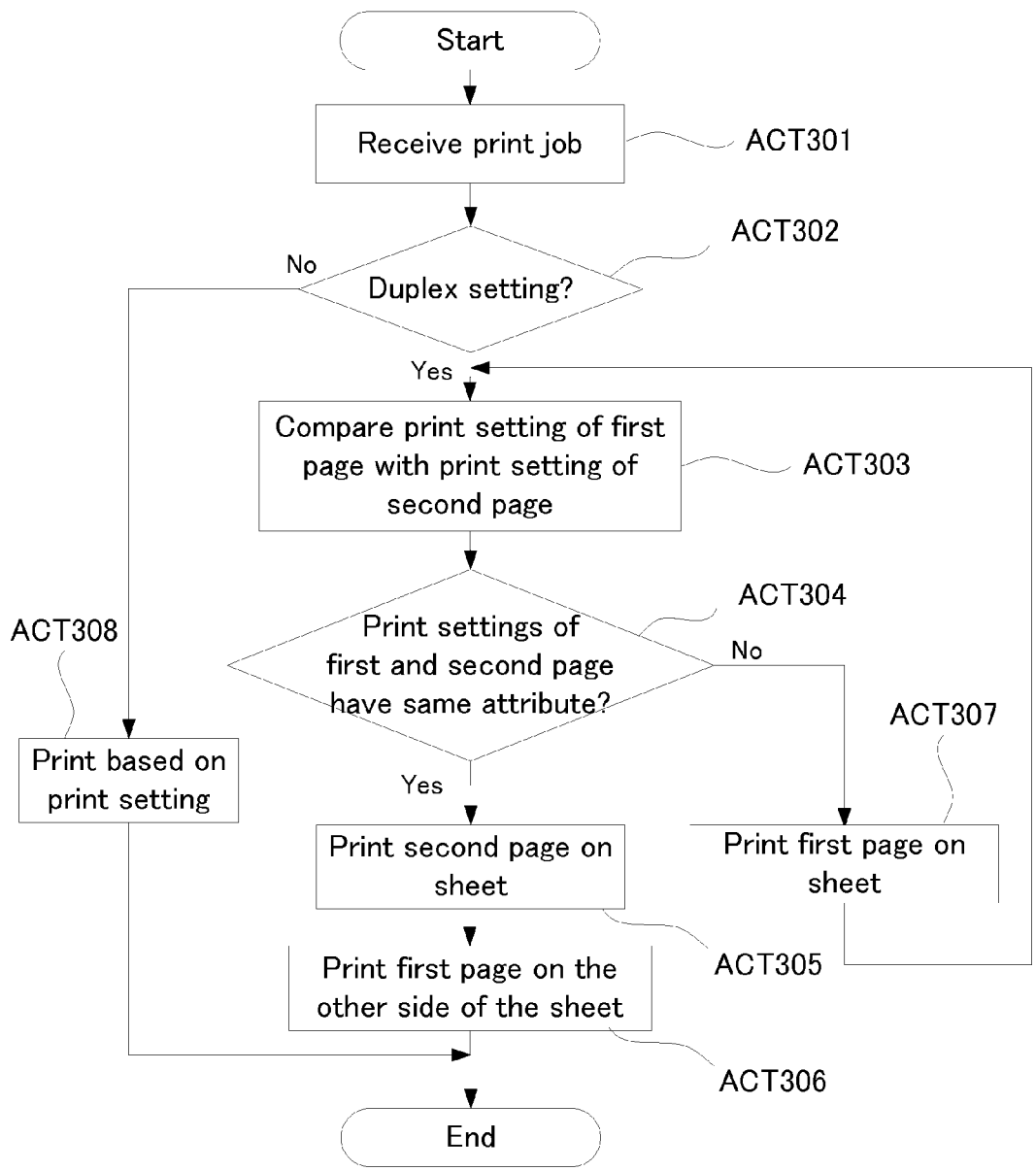
FIG. 9 is a flowchart showing the flow of an image forming process carried out by the image forming apparatus, according to a second embodiment.

FIG. 9 is a flowchart showing the flow of an image forming by the image forming apparatus according to a second embodiment. At ACT 301, the image forming apparatus 2a receives a print job. Specifically, the communication I/F 201 of the image forming apparatus 2a receives the print job sent from the image processing apparatus 1. And the controller 205 receives a print setting of page image included in the print job.

At ACT 302, the controller 205 determines whether the received print job includes the duplex print setting as the layout setting.

If the print job includes the duplex print setting (ACT 302, Yes), the controller 205 compares a print setting of an image data of a first page with a print setting of an image data of a second page (ACT 303).

At ACT 304, the controller 205 determines whether the print setting of the first page and the print setting of the second page are the print settings having the same colorant attribute. Specifically, for example, if the print setting for the first page indicates the decolorable colorant and the print setting for the second page also indicates the decolorable colorant, the controller 205 determines that the print settings of the first page and the second page have the same colorant attribute.

If the controller 205 determines that the print settings of the first page image and the second page image have the same colorant attribute (ACT 304, Yes), the controller 205 executes print processing to print image of the second page on one side of a sheet (ACT 305) and to print image of the first page on the other side of the sheet (ACT 306).

On the other hand, if the controller 205 determines that the print settings of the first page and the second page have different colorant attributes (ACT 304, No), the controller 205 prints processing to print image of the first page on a sheet (ACT 307) and then goes back to ACT 304. When the processing goes back to ACT 303 through ACT 307 after ACT 303 and 304, the print setting of the second page and a print setting of a third page will be compared at ACT 307.

Therefore, if the print job has four pages to be formed, the controller 205 compares the print setting of page 1 with the print setting of page 2. If the print settings of page 1 and page 2 have the same attribute, the controller 205 compares the print setting of page 3 with the print setting of page 4. On the other hand, if the print settings of page 1 and page 2 have different attributes, the controller 205 prints image of page 1 on a sheet and then compares the printing setting of page 2 with the printing setting of page 3. If the print settings of page 2 and page 3 have the same attribute, the controller 205 prints image of page 2 and page 3 on both sides of another sheet.

Then the controller 205 causes the printer 204 to print the image of page 4 on the next sheet since there is no page for comparison.

On the other hand, if the print settings of page 2 and page 3 have different attributes, the controller 205 prints the image of page 2 on another sheet and then compares the print setting of page 3 with the print setting of page 4.

In general, the controller 205 compares image of page X (X is integer number) of a print job with image of page X+1. If the print setting of page X is one of the first setting which indicates the decolorable printing and the second setting which indicates the non-decolorable printing, and the print setting of the page X+1 is the other of the first setting and the second setting, the controller 205 causes the printer 204 to print the X page image and the X+1 page image on different sheets.

In addition, if the print job does not includes the duplex print setting as the layout setting (ACT 302, No), the controller 205 causes the printer 204 to print image based on the print setting of the received print job (ACT 308).

Third Embodiment

Figure 10:
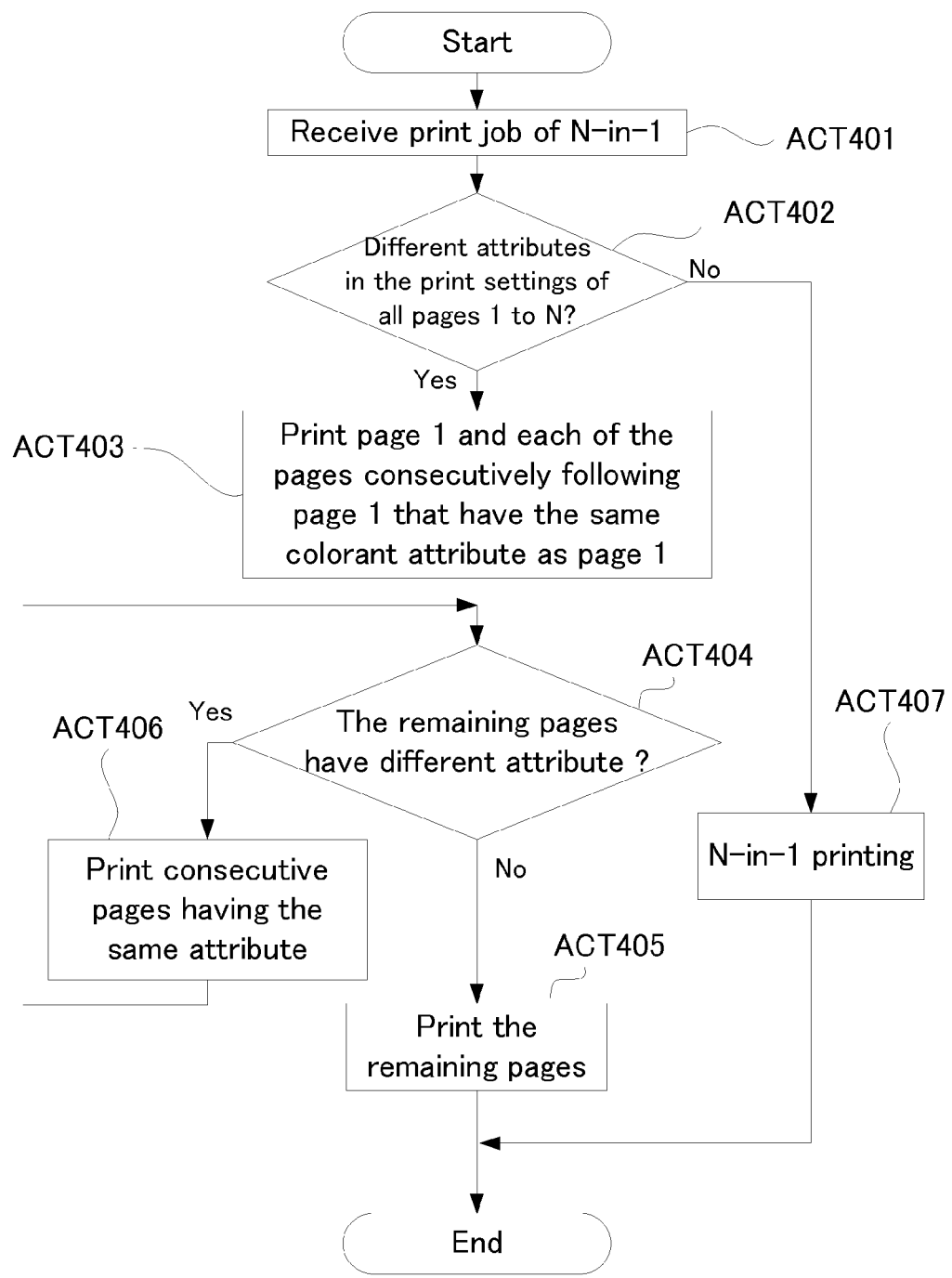
FIG. 10 is a flowchart showing the flow of an image forming process carried out by the image forming apparatus, according to a third embodiment.

Third embodiment is another variation of the first embodiment. FIG. 10 is a flowchart showing the flow of an image forming by the image forming apparatus which receives a print job including the N-in-1 setting as the layout setting. In the following, the same configuration as the above-described first embodiment will be denoted by the same reference numerals and description thereof will be omitted. Hardware configuration of the present embodiment can be same configuration of the above-mentioned embodiments.

Herein, if the print job which includes pages of the decolorable printing and pages for the non-decolorable printing has a N-in-1 setting, the image forming apparatus may form an image with the decolorable colorant an image with the non-decolorable colorant on same side of a sheet. In such a case, the sheet will be non-reusable because of the presence of a non-decolorable image.

In view of the above, if the controller 205 receives a print job which includes the N-in-1 setting (ACT 401), the controller 205 determines whether print settings of all pages between page 1 to page N include different colorant attributes (ACT 402). In other words, the controller 205 determines whether the print settings of all pages between page 1 and page N includes both of the first setting and the second setting. For example, if the print setting for the first page indicates the decolorable colorant and the print setting for the second page indicates the non-decolorable colorant, the controller 205 determines that the print settings of the first page and the second page have different colorant attributes.

If the print settings of pages between page 1 and page N have the same colorant attribute (ACT 402, No), the controller 205 executes the N-in-1 printing according to the print setting of the print job (ACT 407). Namely, if the print settings of all pages between page 1 and page N are one of the first setting and the second setting, the controller 205 causes the printer 204 to form images of page 1 to page N on the same side of a sheet based on the N-in-1 setting.

On the other hand, if the print settings of pages between page 1 and page N have different colorant attributes (ACT 402, Yes), the controller 205 prints images of page 1 and each of the pages consecutively following page 1 so long as they have the same colorant attribute as page 1, on the same side of a sheet (ACT 403). Specifically, if the print settings of pages between page 1 and page N includes both the first setting and the second setting, the controller 205 causes the printer 204 to form images of page 1 and each of the pages consecutively following page 1 that have the same colorant attribute as page 1.

At ACT 404, the controller 205 determines whether the print settings of all remaining pages have different colorant attributes.

If the print settings of the remaining pages have different colorant attributes (ACT 404, Yes), the controller 205 prints the page consecutively following the last page printed and each of the subsequent (consecutively following) pages that have the same colorant attribute, on the same side of another sheet (ACT 406).

If the print settings of the remaining pages have the same colorant attribute (ACT 404, No), the controller 205 prints the remaining pages (ACT 405) on the same side of another sheet.

As described above, if a print job which includes the N-in-1 setting and the print setting including both the decolorable printing and the non-decolorable printing is received, the image forming apparatus determines whether the print setting of each page of a series of N pages have the same colorant attribute. If all of the print settings of the N pages have the same colorant attribute, the image forming apparatus prints according to the print job. On the other hand, if the print settings of the N pages include different colorant attributes, for example, if the colorant attribute of Page N−1 of N pages is different from that of the other pages of N pages, the image forming apparatus prints Page 1 to Page N−2 on the same side of a sheet based on the N-in-1 setting as the layout setting, prints Page N−1 on another sheet, and prints Page N on yet another sheet.

Furthermore, if the colorant attribute of some consecutive pages are different, for example, if the print settings of Page N−2 and Page N−1 have a colorant attribute different from that of the other pages of N pages, the image forming apparatus prints Page 1 to Page N−3 on the same side of a sheet in the layout of the N-in-1, prints Page N−2 and Page N−1 on the same side of another sheet in the layout of the N-in-1, and prints Page N on yet another sheet.

The image forming apparatus according to present embodiment forms a plurality of images of consecutive pages of which the print settings have the same colorant attribute. Here, if page image having a different colorant attribute is formed on another sheet, it may be selected appropriately whether the page image is printed on another sheet in a layout of N-in-1 or other layout adjusted to a maximum size corresponding to the sheet size.

As described above, if the print setting of the print job which includes the N-in-1 setting, is one of the first setting and the second setting, the controller 205 print the images of N pages on same side of a sheet. However, if the print setting of the print job which includes the N-in-1 setting includes both the first setting and the second setting, the controller 205 prints each of the first image formed with the decolorable colorant and the second image formed with the non-decolorable colorant on different sheets.

Fourth Embodiment

Fourth embodiment is another variation of the third embodiment. In the following, the same configuration as the above-described first embodiment will be denoted by the same reference numerals and description thereof will be omitted. Hardware configuration of the present embodiment can be same configuration of the above-mentioned embodiments.

Figure 11:
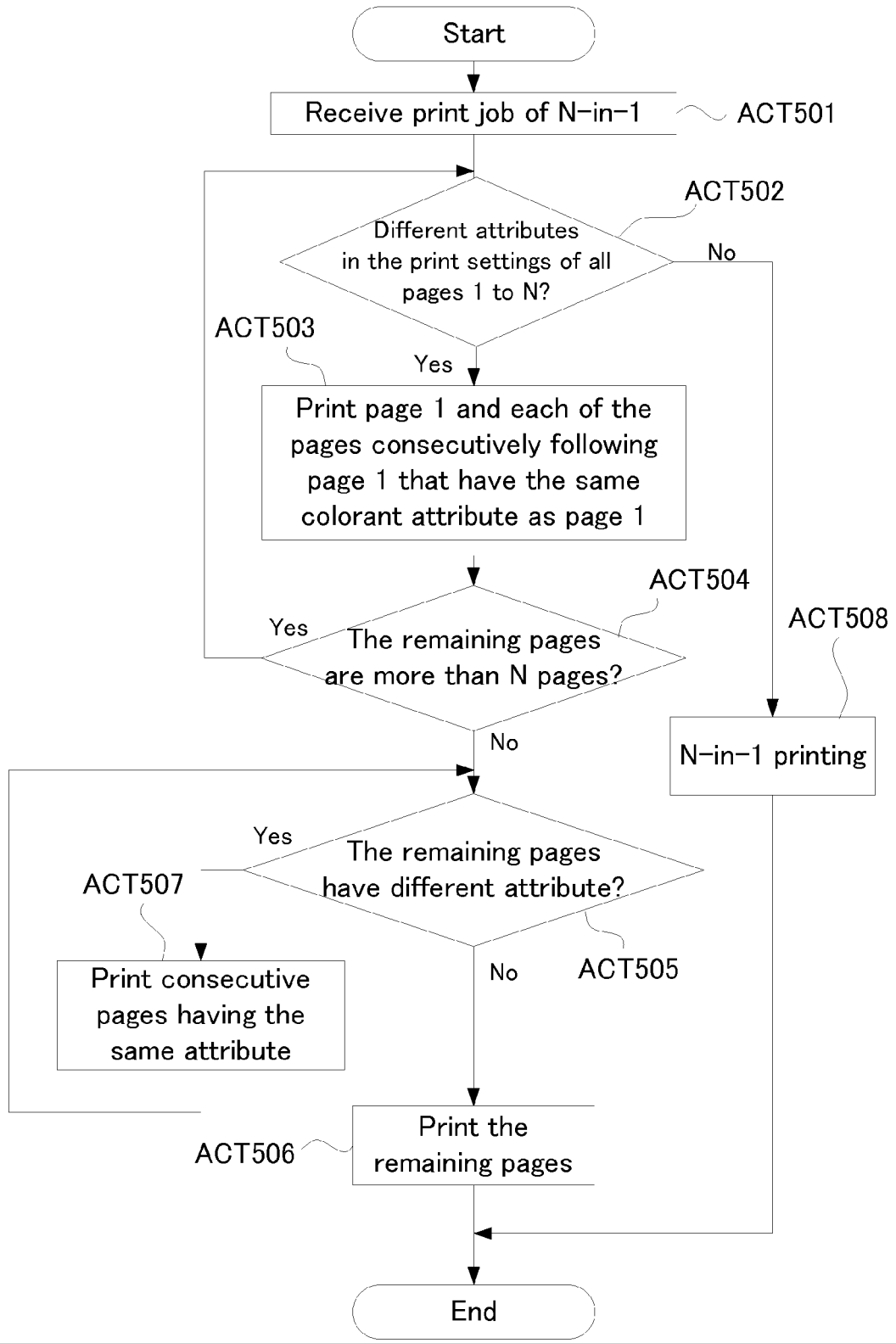
FIG. 11 is a flowchart showing the flow of an image forming process carried out by the image forming apparatus, according to a fourth embodiment.

FIG. 11 is a flowchart showing the flow of an image forming by the image forming apparatus according to the present embodiment. In the present embodiment, if a print setting of Page N' of N pages (N'<N) is different from a print setting of the other pages of N pages, the image forming apparatus prints Page 1 to Page N'−1 on the same side of a sheet, and then determines whether the print setting of N pages which is between Page N' and Page N'+N−1 are same.

If the controller 205 receives a print job which includes the N-in-1 setting (ACT 501), the controller 205 determines whether print settings of pages between page 1 to page N have different colorant attributes (ACT 502). For example, if the print setting for first page indicates the decolorable colorant and the print setting for second page indicates the non-decolorable colorant, the controller 205 determines that the print settings of the first page and the second page have different colorant attribute.

If the print settings of pages between page 1 and page N have the same colorant attribute (ACT 502, No), the controller 205 executes the N-in-1 printing according to the print setting of the print job (ACT 508).

On the other hand, if the print settings of pages between page 1 and page N have different colorant attributes (ACT 502, Yes), the controller 205 prints images of page 1 and each of the pages consecutively following page 1 that have the same colorant attribute as page 1, on the same side of a sheet (ACT 503).

Next, at ACT 504, the controller 205 determines whether the remaining pages of the print job are more than or equal to N pages. If the remaining pages of the print job are more than or equal to N pages (ACT 504, Yes), the processing executed by the controller 205 goes back to ACT 502.

On the other hand, if the remaining pages of the print job are less than N pages (ACT 504, No), the controller 205 determines whether the print settings of the remaining pages of the print job have different colorant attributes (ACT 505).

If the remaining pages of the print job have different colorant attributes (ACT 505, Yes), the controller 205 prints the page consecutively following the last page printed and each of the subsequent (consecutively following) pages that have the same colorant attribute on the same side of another sheet (ACT 507).

If the print settings of the remaining pages have the same colorant attribute (ACT 505, No), the controller 205 prints the remaining pages on the same side of another sheet according to the print setting (ACT 506).

According to the present embodiment, the same effect such as the effects of the first embodiment to the third embodiment is achieved.

Fifth Embodiment

Fifth embodiment is another variation of the third embodiment and fourth embodiment. In the following, the same configuration as the above-described first embodiment will be denoted by the same reference numerals and description thereof will be omitted. Hardware configuration of the present embodiment can be same configuration of the above-mentioned embodiments.

As described above, if a print job which includes the N-in-1 setting and the print setting including both the decolorable printing and the non-decolorable printing is received, the image forming apparatus prints pages which have different colorant attributes on different sheets. If value of N is large (for example, N equal 16, etc.) and there exists some pages of which the colorant attribute is different from that of a contiguous page, excessive sheets will be used because of forming images on different sheets.

With respect to this, the image forming apparatus according to present embodiment prevents from using excessive sheets.

Figure 12:
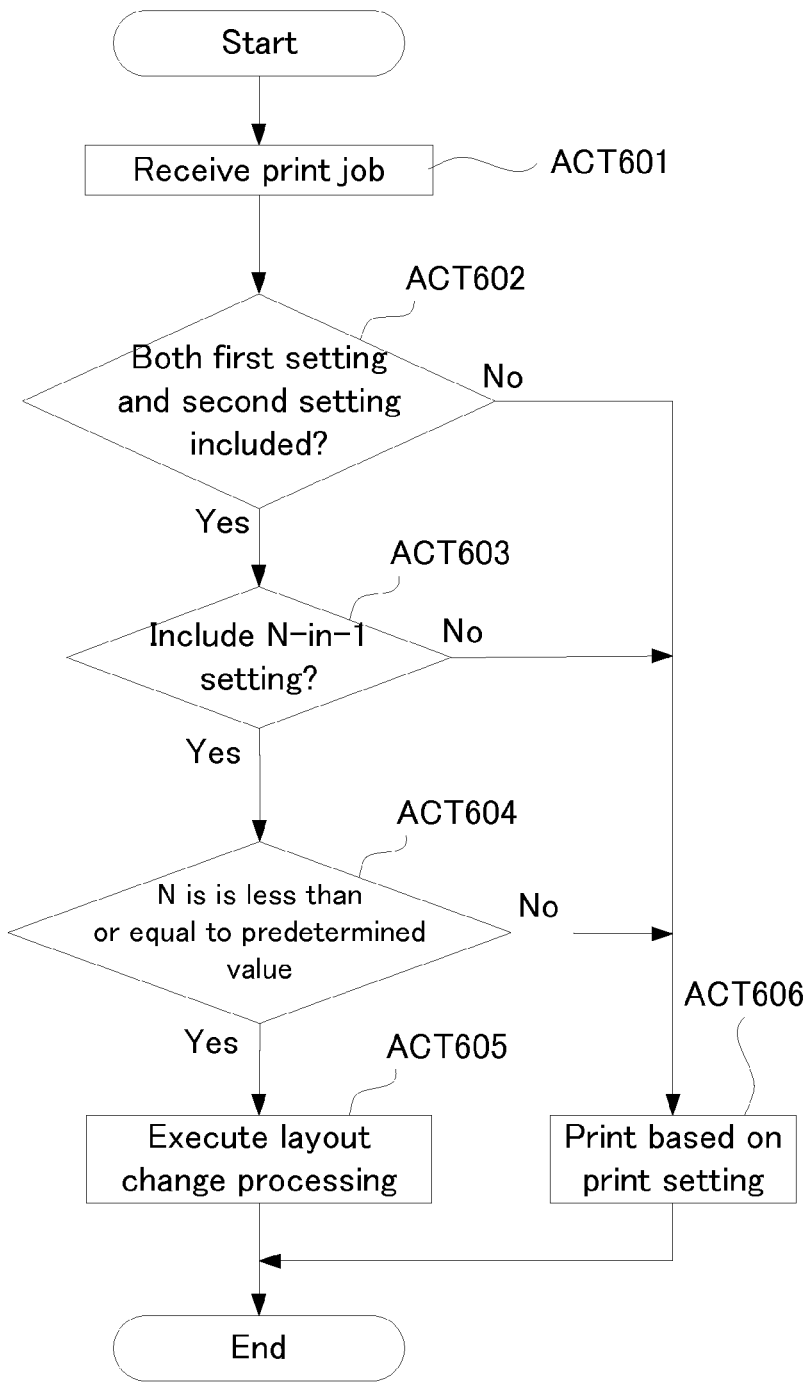
FIG. 12 is a flowchart showing the flow of an image forming process carried out by the image forming apparatus, according to a fifth embodiment.

FIG. 12 is a flowchart showing the flow of an image forming by the image forming apparatus according to the present embodiment. At ACT 601, the image forming apparatus 2*a* receives a print job. The controller 205 receives a print setting of the print job.

At ACT 602, the controller 205 determines whether the print job includes both the first setting for the decolorable printing and the second setting for the non-decolorable printing. At ACT 603, the controller 205 determines whether the print job includes a layout setting of the N-in-1 setting.

If the print job includes both the first setting and the second setting (ACT 602, Yes) and N-in-1 setting as the layout setting (ACT 603, Yes), the controller 205 determines whether value on N is less than or equal to a predetermined value (ACT 604).

If N is less than or equal to the predetermined value, for example N≤8 (ACT 604, Yes), the controller 205 executes print processing (layout change) according to the third embodiment or the fourth embodiment (ACT 605).

On the other hand, if N is more than the predetermined value (ACT 604, No), the controller 205, does not execute the layout change processing of ACT 605, and executes print processing according to the print setting of the print job (ACT 606). The print processing of image forming apparatus is not limited to the processing like ACT 606. For example, the image forming apparatus forms images of all pages with one of the decolorable colorant and non-decolorable colorant. The setting of colorant to be used for printing the all pages could be selected by a user or could be set in an administrative setting of the image forming apparatus in advance.

In addition, if the print job includes only one of the first setting and the second setting (ACT 602, No) or does not include the N-in-1 setting (ACT 603, No), the controller 205 prints according to the print setting (ACT 606).

Sixth Embodiment

According to the above embodiment, if the print job includes the layout setting to form a plurality of page images on a single sheet and includes both the first setting to form an image as the first image with the decolorable colorant and the second setting to form an image as the second image with the non-decolorable colorant, the image forming apparatus prints the first image and the second image on different sheet by changing a layout.

Here, if the print processing is executed with the layout change which is different from the layout setting of the print job, it may confuse a user.

With respect to this, according to the present embodiment, the image forming apparatus inquires a user whether the layout change could be accepted if the processing of changing a layout is executed.

Figure 13:
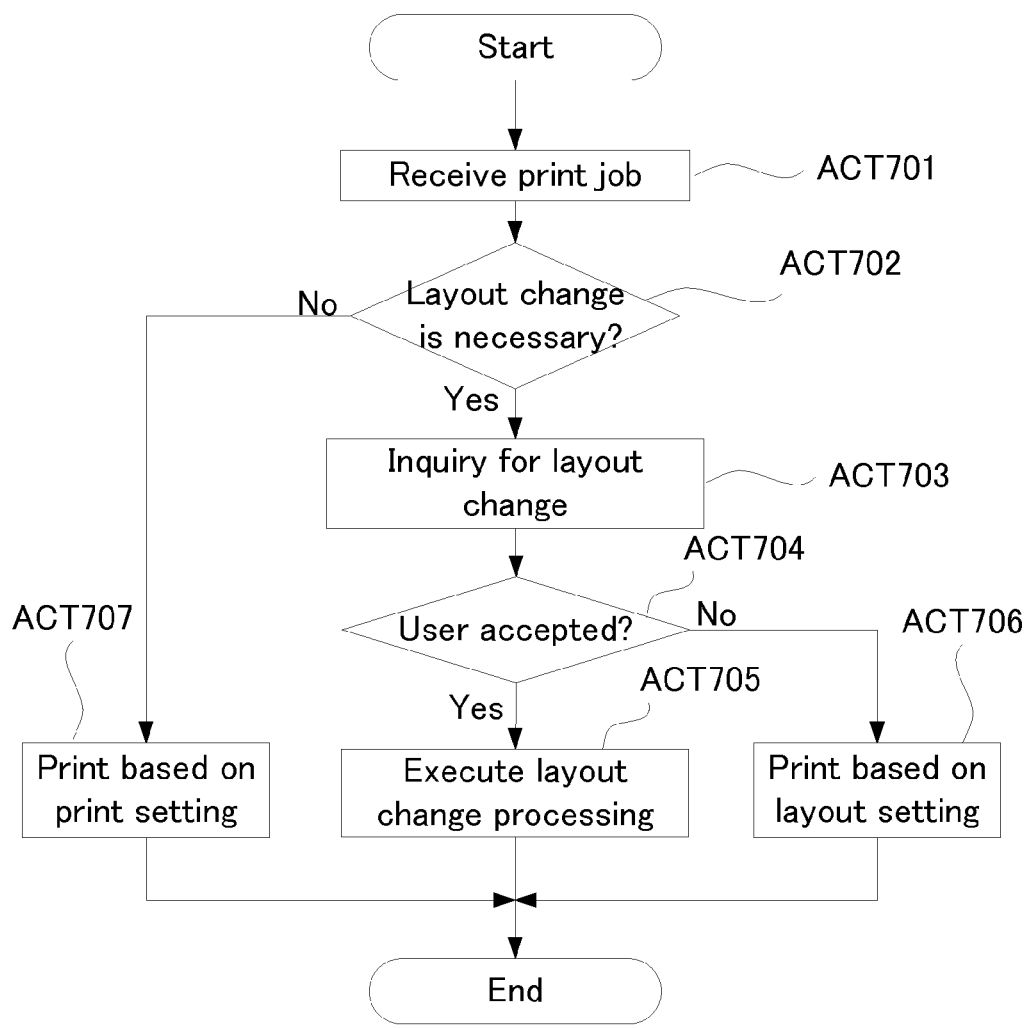
FIG. 13 is a flowchart showing the flow of an image forming process carried out by the image forming apparatus, according to a sixth embodiment.

FIG. 13 is a flowchart showing the flow of an image forming by the image forming apparatus, according to a sixth embodiment. The image forming apparatus 2*a* receives a print job (ACT 701). Specifically, the communications I/F 201 receives a print job which is sent from the image processing apparatus 1. The controller 205 of the image forming apparatus 2*a* receives at least one of the first setting which indicates the decolorable printing to form image as the first image with the decolorable colorant and the second setting which indicates the non-decolorable printing to form image as the second image with the non-decolorable colorant.

AT ACT 702, the controller 205 determines whether a processing of layout change is necessary. The controller 205 determines whether the processing of layout change is necessary as with the processing of the first embodiment to the fifth embodiment. The controller 205 determines whether the print job includes an image for decolorable printing and an image for non-decolorable printing within pages to be formed on same sheet.

If the controller 205 determines that the processing of layout change is necessary (ACT 702, Yes), the controller 205 inquires a user whether the layout change could be accepted, for example, by displaying an inquiry screen on the display 202 (ACT 703).

If the controller receives a signal which indicates that layout change is accepted by the user through the operation key 202*b* of the operating panel 202 (ACT 704, Yes), the controller 205 prints images by executing the processing of the layout change as described in the first embodiment to the fifth embodiment (ACT 705). That is, the controller 205 forms the first image and the second image on different sheet.

On the other side, if the controller receives a signal which indicates that the layout change is not accepted by the user (ACT 704, No), the controller 205 executes print processing according to the layout setting of the print job (ACT 706).

If it is determined that the layout change is not necessary (ACT 702, No), the controller 205 executes print processing according to the print setting of the print job (ACT 707).

As described above, if the print job includes the layout setting and includes both the first setting and the second setting, the controller 205 sends a display data to display a inquiry screen for inquiring a user whether to form the first image and the second image on different sheet or to form the first image and the second image according to the layout setting. Then the controller 205 causes the printer 204 to print images based on the user response received via the operation panel 202.

According to the present embodiment, since the image forming apparatus inquires a user whether the layout change could be accepted before changing the layout designated in the print job, it can prevent confusion of the user.

Furthermore, after forming the first image and the second image on the different sheets by changing the layout designated in the print job, the controller can be configured to form a message, on the sheets, which indicates that the images were printed by changing the designated layout. Hereby, a user can recognize that the layout is changed simply by looking at printed sheets.

Seventh Embodiment

In the present embodiment, the processing of the image forming apparatus which receives a print job including both the N-in-1 setting and the duplex printing setting as the layout setting will be described. Seventh embodiment is another variation of the above-mentioned embodiments.

The image forming apparatus according to present embodiment controls print processing by page of a sheet to be printed if the print job includes both the N-in-1 setting and the duplex printing setting. More specifically, if the print job which includes the first image of decolorable printing and the second image of non-decolorable printing, includes both the N-in-1 setting and the duplex printing setting, the image forming apparatus forms the first image and the second image on different pages. For example, if the print setting of Page N−1 of a document having N pages is different from the print setting of the other pages, the image forming apparatus forms images of Page 1 to Page N−2 on first side of a sheet according to the N-in-1 layout setting, forms image of Page N−1 on second side of the sheet and forms image of Page N on another sheet. The processing mentioned above would fall within the scope of the present embodiment.

According to present embodiment, for example, the image forming apparatus comprises an interface that receives a print job which includes at least one of a first setting to form image as a first image with a decolorable colorant and a second setting to form image as a second image with a non-decolorable colorant, a printer that forms an image on a sheet and a controller configured to determine whether the print job includes at least one of a first layout setting to form plural images on same side of a sheet and a second layout setting to form images on both sides of a sheet. The controller is configured to execute a print processing to form images of print job according to the layout setting if the print job includes both the first layout setting and the second layout setting and only one of the first setting and the second setting and execute a print processing to form the first image and the second image on different sheets if the print job includes both the first layout setting and the second layout setting and both of the first setting and the second setting.

Specifically, if the print job includes the first layout setting and the second layout setting and if the print setting of the pages to be formed on same side of a sheet based on the first layout setting includes both the first setting and the second setting, the controller of the image forming apparatus causes the printer to form the first and second images on different sides of one sheet (top and bottom sides of one sheet) or two sheets (bottom side of one sheet and top side of another sheet).

Furthermore, if the print settings of predetermined number of pages to be formed on same side of a sheet based on the first layout setting include the first setting and the second setting and the predetermined number is more than a defined value, the controller causes the printer to form the predetermined number of pages with one of the decolorable colorant and the non-decolorable colorant on the same side of the sheet according to the first layout setting.

According to the present embodiment, if the print job includes the first page of decolorable printing and the second page of non-decolorable printing, the image forming apparatus can prevent the forming of the first page and the second page on the same side of a sheet. Therefore, at least one side of the sheet which is formed with the decolorable colorant is available after decolorable processing.

Eighth Embodiment

Figure 14:
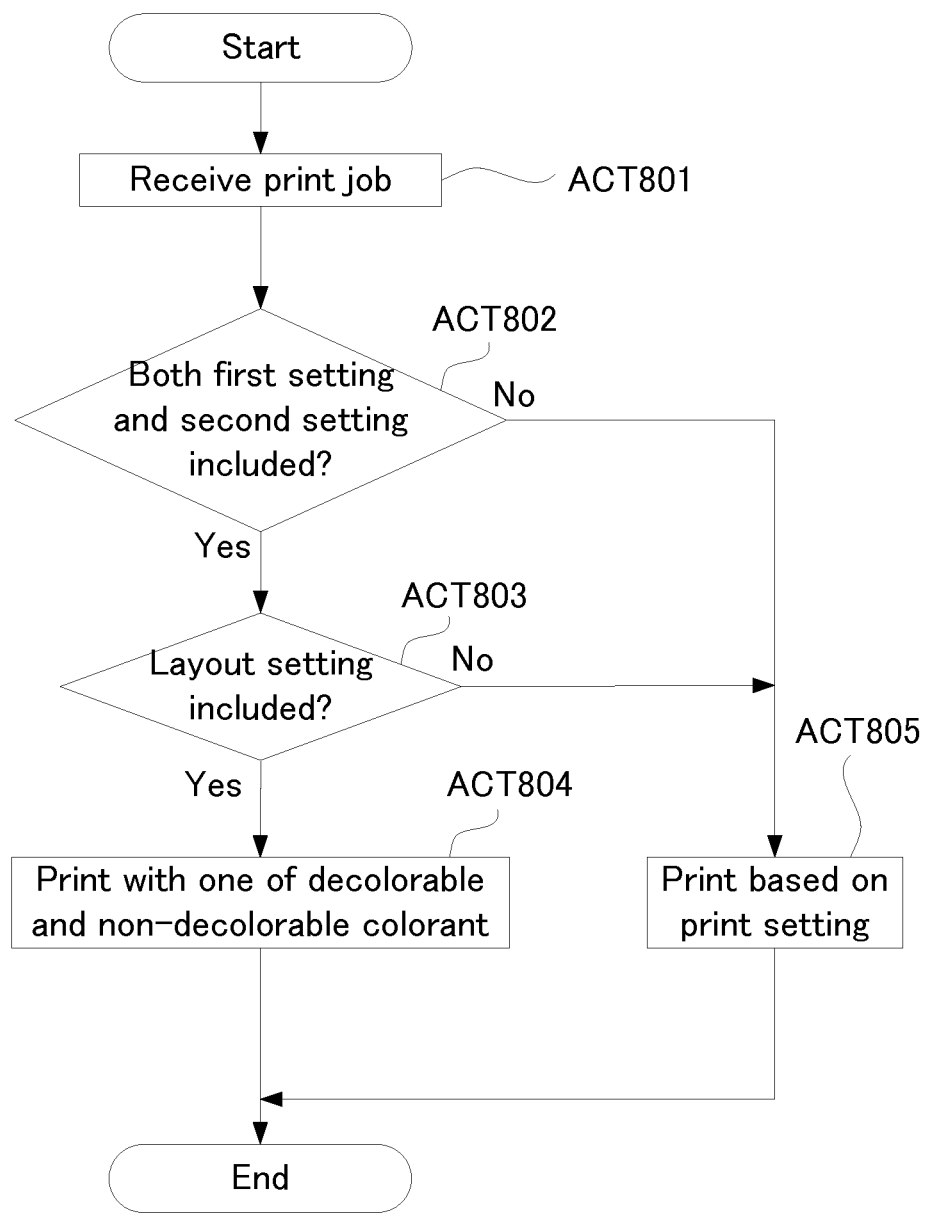
FIG. 14 is a flowchart showing the flow of an image forming process carried out by the image forming apparatus, according to an eighth embodiment.

FIG. 14 is a flowchart showing the flow of an image forming by the image forming apparatus according to an eighth embodiment.

In the above-mentioned embodiments of the first to seventh, if the image forming apparatus receives a print job which includes a page for the decolorable printing and a page for the non-decolorable printing, the image forming apparatus does not form the first image which is formed with the decolorable colorant with the second image which is formed with the non-decolorable colorant on both sides of the same sheet or the same side of one sheet.

However, some user may hesitate to the layout change mentioned above. So, the image forming apparatus according to present embodiment forms all images with one of the decolorable colorant and the non-decolorable colorant, if a print job includes both decolorable printing setting and non-decolorable printing setting and at least one of the duplex print setting and the N-in-1 setting.

The image forming apparatus 2a receives a print job (ACT 801). Specifically, the communications I/F 201 receives a print job which is sent from the image processing apparatus 1.

The controller 205 of the image forming apparatus 2a receives at least one of the first setting which indicates the decolorable printing to form image as the first image with the decolorable colorant and the second setting which indicates the non-decolorable printing to form all image as the second image with the non-decolorable colorant.

At ACT 802, the controller 205 determines whether the print job includes both the first setting for the decolorable printing and the second setting for the non-decolorable printing. At ACT 803, the controller 205 determines whether the print job includes the layout setting to form the plurality of images on a single sheet. The layout setting may be the duplex print setting or the N-in-1 setting.

If the print job includes both the first setting and the second setting (ACT 802, Yes) and includes the layout setting (ACT 803, Yes), the controller 205 causes the printer 204 to form all images of the print job with one of the decolorable colorant and the non-decolorable colorant (ACT 804). The setting of the colorant to be used to form images can be set via the operation panel 202 of the image forming apparatus 2a and the like, in advance.

Furthermore, a user may set whether to execute the processing of the layout change, as the first embodiment to second embodiment, via the operation panel 202 of the image forming apparatus 2a and the like, in advance.

If the print job includes one of the first setting and the second setting (ACT 802, No), or if the print job includes no the layout setting (ACT 803, No), the controller 205 executes print processing according to the print setting of the print job (ACT 805).

According to present embodiment, the image forming apparatus can retain the layout setting which is designated by a user and can prevent from forming the first page and the second page on a sheet.

The processing of the controller 205 at ACT 803 is not limited to this. For example, the controller 205 may execute the processing of ACT 804 if the print job includes both the duplex print setting and the N-in-1 setting at ACT 803. On the other hand, if the print job includes one of the duplex print setting and the N-in-1 setting, the controller 205 control to print as described in the first embodiment to the fifth embodiment.

The above-mentioned processing of the image forming apparatus is implemented when the processor 205a reads and executes image forming programs stored in the memory 205b and the like.

In addition, a program that causes a computer that is implemented as part of an image forming apparatus to execute the above-described operations can be provided as an image forming program. Although the present embodiment was illustrated such that the program for realizing the functions implementing the invention is recorded in advance in a storage region provided in the apparatus, the invention is not limited to this. A similar program may be downloaded to the apparatus from a network, or a similar program stored in a computer-readable recording medium can be installed in the apparatus. The recording medium may be in any form that can store a program and can be read by a computer. Specifically, such recording media may include, for example, internal storage devices arranged within a computer such as ROM and RAM, portable storage media such as CD-ROM, flexible disk, DVD disk, magneto-optical disk and IC card, database which holds computer programs, another computer and its database, and a transmission medium on a network line. The functions that can be acquired in advance by installation and downloading may be realized in cooperation with the OS (operating system) in the apparatus.

A part or an entirety of the program may be an execution module that is dynamically generated.

The invention can be embodied in a variety of other forms without departing from the spirit or major features thereof. Therefore, the embodiments described above are exemplary only in all respects, and are not intended to limit the scope of the invention. The scope of the invention should be defined by the accompanying claims and should not be restricted to the main body of the specification. Furthermore, all changes, various improvements, substitutions and alterations made within the equivalent range of the claims would fall within the scope of the invention.

What is claimed is:

1. An image forming apparatus, comprising:
a printer that forms an image on a sheet;
an interface through which print data which includes at least one of a first setting and a second setting, is received, the first setting being a setting to form a first image with a decolorable colorant and the second setting being a setting to form a second image with a non-decolorable colorant; and
a controller configured to
determine whether the received print data includes a layout setting to form a plurality of images on a sheet,
if the print data includes the layout setting and only one of the first setting and the second setting, cause the printer to form the images with a corresponding one of the decolorable colorant and the non-decolorable colorant on the sheet based on the layout setting, and
if the print data includes the layout setting and both the first setting and the second setting, cause the printer to form each of the first image and the second image on different sheets.

2. The image forming apparatus according to claim 1, wherein
the controller determines whether print settings of images to be formed on the sheet according to the layout setting include both the first setting and the second setting, and
if the print settings include the first setting and the second setting, causes the printer to form each of the first image and the second image on different sheets.

3. The image forming apparatus according to claim 2, wherein
the layout setting is a duplex print setting to form image of a first page of the print data on one side of a sheet and to form image of a second page of the print data on the other side of the sheet, and
the controller is configured to
if the print settings of the first page and second page include only one of the first setting and the second setting, cause the printer to form images of the first page and the second page on both sides of the sheet, and
if the print settings of the first page and the second page include both the first setting and the second setting, cause the printer to form images of the first page and the second page on the different sheets.

4. The image forming apparatus according to claim 3, wherein
if the print settings of the first page and the second page include both the first setting and the second setting, the controller causes the printer to form image of the first page on a sheet and determines whether the print settings of the second page and a third page of the print data include both the first setting and the second setting.

5. The image forming apparatus according to claim 2, wherein the layout setting is a N-in-1 setting to form images of N pages in one side of a sheet, and
the controller is configured to
if the print settings of the N pages include only one of the first setting and the second setting, cause the printer to form images of the N pages on one side of the sheet, and
if the print settings of the N pages include both the first setting and the second setting, cause the printer to form the first image and the second image on the different sheets.

6. The image forming apparatus according to claim 5, wherein
if the print settings of the N pages include the first setting and the second setting, the controller causes the printer to form images of page 1 and each of the pages consecutively following page 1 having a colorant attribute that is the same as that of page 1, on the same side of the sheet.

7. The image forming apparatus according to claim 2, further comprising:
a user interface that receives a user input which is inputted via an operation device,
wherein, if the print data includes the layout setting and both the first setting and the second setting, the controller is configured to send a display data to the operation device, the display data being data to display an inquiry screen for inquiring whether to form the first image and the second image on different sheets or to form the first image and the second image according to the layout setting.

8. An image forming method, comprising:
receiving print data which includes at least one of a first setting and a second setting, the first setting being a setting to form a first image with a decolorable colorant and the second setting being a setting to form a second image with a non-decolorable colorant; and
determining whether the received print data includes a layout setting to form a plurality of images on a sheet;
forming, by a printer, the images with only one of the decolorable colorant and the non-decolorable colorant on the sheet based on the layout setting if the print data includes the layout setting and only one of the first setting and the second setting; and
forming, by the printer, each of the first image and the second image on different sheets if the print data includes the layout setting and both the first setting and the second setting.

9. The image forming method according to claim 8, wherein the step of determining includes determining whether print settings of images to be formed on the sheet according to the layout setting include the first setting and the second setting.

10. The image forming method according to claim 9, wherein
the layout setting is a duplex print setting to form image of a first page of the print data on one side of a sheet and to form image of a second page of the print data on the other side of the sheet, and
the steps of forming images include:
forming images of the first page and the second page on both sides of the sheet if the print settings of the first page and second page include only one of the first setting and the second setting, and
forming images of the first page and the second page on the different sheets if the print settings of the first page and the second page include both the first setting and the second setting.

11. The image forming method according to claim 10, wherein the step of the forming images on the different sheets includes forming image of the first page on a sheet if the print settings of the first page and the second page include both the first setting and the second setting, and further comprising:
determining whether the print settings of the second page and a third page include both the first setting and the second setting.

12. The image forming method according to claim 9, wherein
the layout setting is a N-in-1 setting to form images of N pages in one side of a sheet, and
the steps of forming images include:
forming images of the N pages on one side of the sheet if the print settings of the N pages include one of the first setting and the second setting, and
forming the first image and the second image on the different sheets if the print settings of the N pages include both the first setting and the second setting.

13. The image forming method according to claim 12, wherein
the step of forming images on the different sheets includes the first setting and the second setting includes forming images of page 1 and each of the pages consecutively following page 1 having a colorant attribute that is the same as that of page 1, on same side of the sheet if the print settings of the N pages includes both the first setting and the second setting.

14. An image forming system, comprising:
an interface through which print data which includes at least one of a first setting and a second setting, is received, the first setting being a setting to form a first image with a decolorable colorant and the second setting being a setting to form a second image with a non-decolorable colorant;
a controller that determines whether the received print data includes a layout setting to form a plurality of images on a sheet; and
a printer configured to
if the print data includes the layout setting and only one of the first setting and the second setting, form the images with a corresponding one of the decolorable colorant and the non-decolorable colorant on the sheet based on the layout setting, and
if the print data includes the layout setting and both the first setting and the second setting, form each of the first image and the second image on different sheets.

15. The image forming system according to claim 14, wherein
the controller determines whether print settings of images to be formed on the sheet according to the layout setting include both the first setting and the second setting, and
the printer forms each of the first image and the second image on different sheets if the print settings include both the first setting and the second setting.

16. The image forming system according to claim 15, wherein
the layout setting is a duplex print setting to form image of a first page of the print data on one side of a sheet and to form image of a second page of the print data on the other side of the sheet, and
the printer is configured to
if the print settings of the first page and second page include only one of the first setting and the second setting, form images of the first page and the second page on both sides of the sheet, and
if the print settings of the first page and the second page include both the first setting and the second setting, form images of the first page and the second page on the different sheets.

17. The image forming system according to claim 16, wherein if the print settings of the first page and the second page include both the first setting and the second setting, the printer forms the image of the first page on a sheet, and
the controller determines whether the print settings of the second page and a third page of the print data include both the first setting and the second setting.

18. The image forming system according to claim 15, wherein
the layout setting is a N-in-1 setting to form images of N pages in one side of a sheet, and
the printer is configured to
if the print settings of the N pages include only one of the first setting and the second setting, form images of the N pages on one side of the sheet, and
if the print settings of the N pages include both the first setting and the second setting, form the first image and the second image on the different sheets.

19. The image forming system according to claim 18, wherein
if the print settings of the N pages include the first setting and the second setting, the printer forms images of page 1 and each of the pages consecutively following page 1 having a colorant attribute that is the same as that of page 1, on the same side of the sheet.

20. The image forming system according to claim 15, further comprising:
a user interface that receives a user input which is inputted via an operation device,
wherein, if the print data includes the layout setting and both of the first setting and the second setting, the controller is configured to send a display data to the operation device, the display data being data to display an inquiry screen for inquiring whether to form the first image and the second image on different sheets or to form the first image and the second image according to the layout setting.

* * * * *